US009020988B2

(12) United States Patent
Rubenstein et al.

(10) Patent No.: US 9,020,988 B2
(45) Date of Patent: Apr. 28, 2015

(54) DATABASE AGGREGATION OF PURCHASE DATA

(71) Applicant: SmartProcure, LLC, Deerfield Beach, FL (US)

(72) Inventors: Jeffrey David Rubenstein, Boca Raton, FL (US); Wagner Figueiredo Dosanjos, Clearwater, FL (US)

(73) Assignee: SmartProcure, Inc., Deerfield Beach, FL (US)

( * ) Notice: Subject to any disclaimer, the term of this patent is extended or adjusted under 35 U.S.C. 154(b) by 220 days.

(21) Appl. No.: 13/732,145

(22) Filed: Dec. 31, 2012

(65) Prior Publication Data

US 2014/0188948 A1 Jul. 3, 2014

(51) Int. Cl.
*G06F 7/00* (2006.01)
*G06F 17/30* (2006.01)
*G06Q 30/06* (2012.01)

(52) U.S. Cl.
CPC .......... *G06F 17/30489* (2013.01); *G06Q 30/06* (2013.01)

(58) Field of Classification Search
CPC .................................................... G06F 17/243
USPC .......................................................... 707/821
See application file for complete search history.

(56) References Cited

U.S. PATENT DOCUMENTS

| | | | | |
|---|---|---|---|---|
| 7,336,639 | B1 * | 2/2008 | Dwekat et al. | 370/340 |
| 7,702,694 | B1 * | 4/2010 | Perkins et al. | 707/790 |
| 8,090,711 | B2 * | 1/2012 | Burger et al. | 707/723 |
| 8,239,270 | B2 * | 8/2012 | Keld | 705/17 |
| 8,438,132 | B1 * | 5/2013 | Dziuk et al. | 707/635 |
| 8,589,227 | B1 * | 11/2013 | Bridge et al. | 705/14.41 |
| 2002/0059191 | A1 * | 5/2002 | Tamura | 707/2 |
| 2002/0062241 | A1 * | 5/2002 | Rubio et al. | 705/10 |
| 2003/0046217 | A1 * | 3/2003 | Deaderick et al. | 705/37 |
| 2006/0136449 | A1 * | 6/2006 | Parker et al. | 707/101 |
| 2008/0222192 | A1 * | 9/2008 | Hughes | 707/102 |
| 2011/0125740 | A1 * | 5/2011 | Peters et al. | 707/736 |
| 2014/0095486 | A1 * | 4/2014 | Caldwell | 707/722 |

* cited by examiner

*Primary Examiner* — Binh V Ho
(74) *Attorney, Agent, or Firm* — Fleit Gibbons Gutman Bongini & Bianco PL; Jon A. Gibbons; Michael DeLuca

(57) ABSTRACT

A big data database managed by a procurement service aggregates purchase data received from federal, state and local government agencies through Freedom of Information Act requests, state public records requests and private sector business entities. An automated system processes a vast amount of purchase data files acquired from numerous different agencies through a number of different transports, on a variety of different media, included within several different file formats. A best match is selected for each acquired file with one of a multitude of configuration files available to process the purchase files. The file is then processed with the selected configuration file and aggregated into the database. The database is then made available to customers of the procurement service for search, reports and analysis purposes.

21 Claims, 23 Drawing Sheets

| Id | State | Agency | Status | Content | Ext | Size | File Name |
|---|---|---|---|---|---|---|---|
| 4665 | GA | City of Thomasville | Normalize_Finish | PO_Vendor | xls | 7,489,024 | Purchase Orders_20121219_221803.xls |
| 4663 | TX | Kendall County | Normalize_Finish | Vendor | pdf | 184,504 | Vendor Summary Report_20121219_201629.pdf |
| 4662 | TX | Kendall County | Normalize_Finish | PO_Vendor | pdf | 1,066,528 | servlet2D_1_2_20121219_201359.pdf |
| 4661 | TX | Kendall County | Normalize_Finish | PO_Vendor | pdf | 1,109,920 | servlet2011_20121219_201329.pdf |
| 4660 | TX | Kendall County | Normalize_Finish | PO_Vendor | pdf | 1,117,552 | servlet2010_20121219_201329.pdf |
| 4659 | TX | Kendall County | Normalize_Finish | PO_Vendor | pdf | 1,111,190 | servlet_2012012_201259.pdf |
| 4647 | GA | City of Dunwoody | Normalize_Finish | Vendor | pdf | 99,014 | Dunwoody AP Vendor Listing_20121219_091840.pdf |
| 4646 | GA | City of Dunwoody | Normalize_Finish | PO_Vendor | pdf | 88,402 | Dunwoody P.O. Status Report_20121219_091840.pdf |
| 4641 | TX | Anderson County | Normalize_Finish | PO_Vendor | pdf | 9,220,808 | PO Status Report - 0968_20121218_172011.pdf |
| 4640 | TX | Anderson County | Normalize_Finish | PO_Vendor | txt | 8,383,519 | PO Status Report - 0926_20121218_172011.txt |

Import #: 4662  TX Kendall County
Status: Normalize_Finish  File Name: servlet2012_20121219_201359.pdf
Content: PO_Vendor  Config: Generic- PurchaseOrders- POListByPO(PDFTab Extraction).po-vendor.config.txt
Notes: 12/19/12 LW
12/19/2012 ConfigSearch

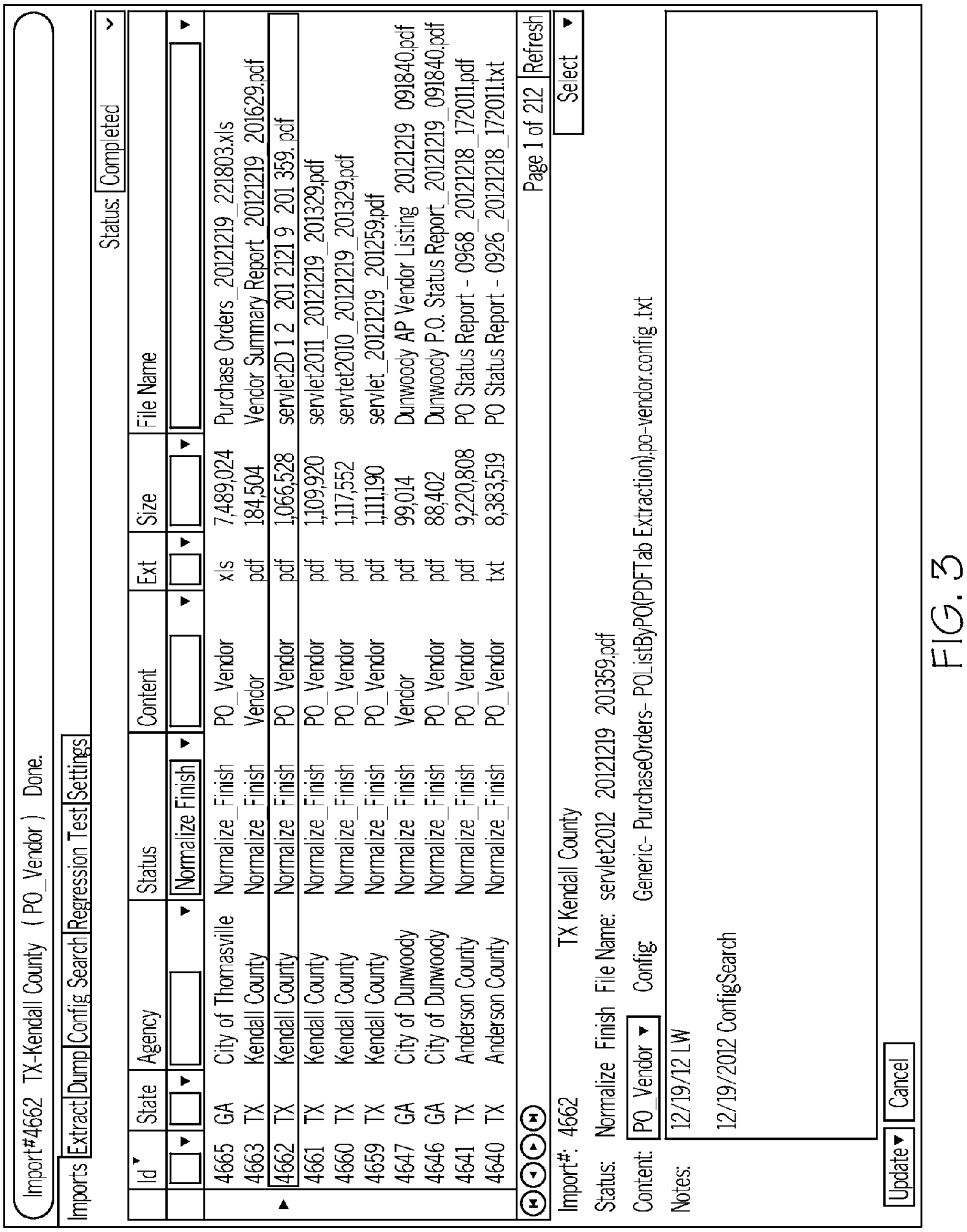

FIG. 3

Purchase Orders
PO List

User: Sharon
Printed: 12/19/2012 - 3:02PM

THE STATE OF TEXAS, KENDALL COUNTY

| PO# / Vendor / Line | Date / Name / Account | PO Desc / Line Desc | PM Task | | Amount | Invoiced | Balance | Encumbered |
|---|---|---|---|---|---|---|---|---|
| 0000120001 | 10/03/11 | | | | | | | 0.00 |
| 4735 | Conference on Crimes Again | | | | | | | |
| 001 | 50-475-54270 | Conf. Regis/N.Carpenter | - | | 325.00 | 325.00 | 0.00 | 0.00 |
| | | | | PO Total | 325.00 | 325.00 | 0.00 | 0.00 |
| 0000120002 | 10/03/11 | | | | | | | 0.00 |
| 3365 | HTS Voice And Data Systems | | | | | | | |
| 001 | 11-620-55510 | 3 Desktop Computers | - | | 3,315.00 | 3,192.30 | 0.00 | 122.70 |
| 002 | 11-620-55520 | 3 Software | - | | 1,140.00 | 1,140.00 | 0.00 | 0.00 |
| | | | | PO Total | 4,455.00 | 4,332.30 | 0.00 | 122.70 |
| 0000120003 | 10/03/11 | | | | | | | 0.00 |
| 3891 | Legend Refrigeration, LLC | | | | | | | |
| 001 | 11-620-55400 | Ice Machine | - | | 5,233.00 | 5,000.00 | 0.00 | 250.00 |
| | | | | PO Total | 5,233.00 | 5,000.00 | 0.00 | 250.00 |
| 0303120004 | 10/03/11 | | | | | | | 0.00 |
| 3170 | Capital City Leasing Inc | | | | | | | |
| 001 | 11-620-55200 | F150 Parts Truck | - | | 6,000.00 | 0.00 | 6,000.00 | 6,000.00 |
| 002 | 11-620-55200 | F250 Crew Truck | - | | 9,000.00 | | 9,000.00 | 9,000.00 |
| | | | | PO Total | 15,000.00 | 0.00 | 15,000.00 | 15,000.00 |
| 0000120005 | 10/03/11 | | | | | | | 0.00 |
| 3170 | Capital City Leasing Inc | | | | | | | |
| 001 | 11-665-55200 | F250 Crew Cab | - | | 8,777.13 | 8,777.13 | 0.00 | 0.00 |
| | | | | PO Total | 8,777.13 | 8,777.13 | 0.00 | 0.00 |

FIG. 4

| Import #4662 TX-Kendall County ( PO Vendor ) Done. |
| --- |
| Imports | Extract | Dump | Config Search | Regression Test | Settings |
| Source File: D:\DataFiles\TX Kendall County\servlet2012_20121219_201359.pdf |

| Search | Valid Flds | Pop. Flds | Source | Config | Tags | Config Name |
| --- | --- | --- | --- | --- | --- | --- |
| 389 | | 395 | 100.00 % | 92.86 % | 100.00 % | |
| | 0 | 0 | 3.00 % | 7.69 % | 100.00 % | Generic-PurchaseOrders-POListByPO(PDFTabExtraction).po-vendor.config.txt |
| | 6 | 6 | 9.15 % | 53.85 % | 50.00 % | Generic-PurchaseOrders-POListByPO(PDFTagExtraction).po-vendor.config.txt |
| | 236 | 250 | 22.45 % | 25.00 % | 0.00 % | StLucieCountyBoardofCountyCommissioners.config.txt |
| | 3 | 5 | 0.05 % | 15.38 % | 0.00 % | Generic-PurchaseOrderListingByPONumber.po.config.txt |
| | 2 | 2 | 9.20 % | 38.46 % | 0.00 % | Generic-PurchaseOrders-POListByVendor.po-vendor.config.txt |
| | 2 | 2 | 0.05 % | 8.33 % | 0.00 % | Generic-AccountsPayable-OpenItemReport-Detail.po-vendor.config.txt |
| | 2 | 2 | 0.05 % | 8.33 % | 0.00 % | Generic-PurchaseOrderListingByVendorId.po-vendor.config.txt |
| | 1 | 2 | 0.05 % | 11.11 % | | CountyofSpalding-(PdfSpaceExtraction).po-vendor.config.txt |
| | 1 | 2 | 0.05 % | 8.33 % | | Generic-ini03r01-PurchasingReportByVendor(PdfSpaceExtraction).po-vendor.config.txt |

| Source Preview | PO Preview | Vendor Preview | Config |
| --- |
| @tags:Purchase Orders;PO List;PM Task |
| @strategy: PdfTabExtraction |
| {noise|PO List;|} |
| {noise|User: |.|} |
| {noise|Printed: |.|} |
| {noise|PO # Date PO Desc |
| {noise|Vendor  Name |
| {noise|Line Account  Line Desc  PM Task  Amount Invoiced  Balance  Encumbered |
| {noise|PO| ( *|-| *|PO List (03/29/2012) - [11:36 AM]  {!} |
| {noise|Invoice: |.} |
| {=PO.PO_Number}  {=PO.Issued_Date}  {=PO.Description}  {for} {=PO.PO_Number} {=PO.Description@Replace (" 0.00 |
| {=PO.Vendor_Number,Vendor_Number}  {=VendorName}] |
| {L_n} {=Item.Line_Number} {*999-99-99-999-99\} - {=Item.Description}  {=Item.Total_Price} {} {} {for} {=Item.Line_Number} |
| PO Total  {=PO.PO_Amount}  {} {} {} {!SavePO,Vendor} |
| {0..} Report Total {} {} |

10 configs matched

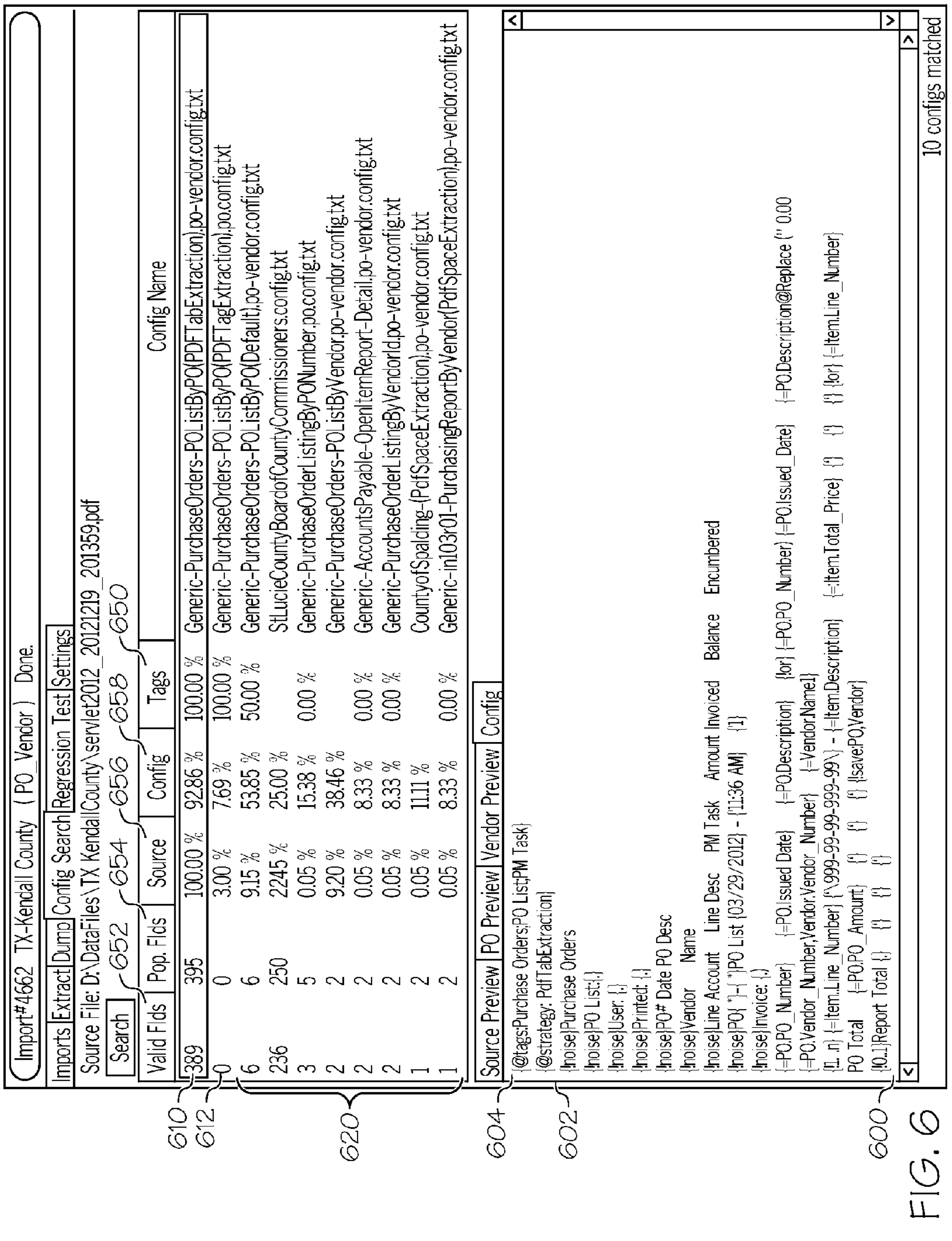

FIG. 6

Import:#4662 TX-Kendall County (PO_Vendor) Done.

Imports | Extract | Dump | Config Search | Regression Test | Settings

Source File: D:\DataFiles\TX Kendall County\servlet2012_20121219_201359.pdf

Search

| Valid Flds | Pop. Flds | Source | Config | Tags | Config Name |
|---|---|---|---|---|---|
| 389 | 395 | 100.00 % | 92.86 % | 100.00 % | Generic-PurchaseOrders-POListByPO(PDFTabExtraction).po-vendor.config.txt |
| 0 | 0 | 3.00 % | 7.69 % | 100.00 % | Generic-PurchaseOrders-POListByPO(PDFTagExtraction).po.config.txt |
| 6 | 6 | 9.15 % | 53.85 % | 50.00 % | Generic-PurchaseOrders-POListByPO(Default).po-vendor.config.txt |
| 236 | 250 | 22.45 % | 25.00 % | 0.00 % | StLucieCountyBoardofCountyCommissioners.config.txt |
| 3 | 5 | 0.05 % | 15.38 % | 0.00 % | Generic-PurchaseOrderListingByPONumber.po.config.txt |
| 2 | 2 | 9.20 % | 38.46 % | 0.00 % | Generic-PurchaseOrders-POListByVendor.po-vendor.config.txt |
| 2 | 2 | 0.05 % | 8.33 % | 0.00 % | Generic-AccountsPayable-OpenItemReport-Detail.po-vendor.config.txt |
| 2 | 2 | 0.05 % | 8.33 % | 0.00 % | Generic-PurchaseOrderListingByVendorId.po-vendor.config.txt |
| 1 | 2 | 0.05 % | 11.11 % | 0.00 % | CountyofSpalding-(PdfSpaceExtraction).po-vendor.config.txt |
| 1 | 2 | 0.05 % | 8.33 % | 0.00 % | Generic-int103r01-PurchasingReportByVendor(PdfSpaceExtraction).po-vendor.config.txt |

Source Preview | PO Preview | Vendor Preview | Config

```
// Author: WDosArjos 8/12/2012 //
{@tags:PO-PO List,Report Total}
{@strategy: PdfTagExtraction}
{@define:PO ItemVendor | Vendor_Number}
[F036] User:
[F036] Printed:   [F102] {,}
[F102] {}
[F036] Purchase Orders
[F036] PO List
|noise8| [F036] PO#
|noise| [F036] PO-PO List {,} Page {,}
|first| {=[F036]PO-PO_Number} {=[F138] PO.Issued_Date} { [F740] }
{=[F036]Vendor.Vendor_Number,PO.Vendor_Number} {=[F138]Vendor.Name}
|first| {=[F036]Vendor.Vendor_Number} { '=[F240] ItemDescription} {' '=[F390] - } {=[F5,] Item.Total_Price} {,}
|last| |0..n| [F074] Invoice: {,} {!hsave:Item}
|last| [F415] PO Total     {=[F5,] PO.PO_Amount} {} {!savePO,Vendor}
[F401] Report Total: {,}
```

10 configs matched

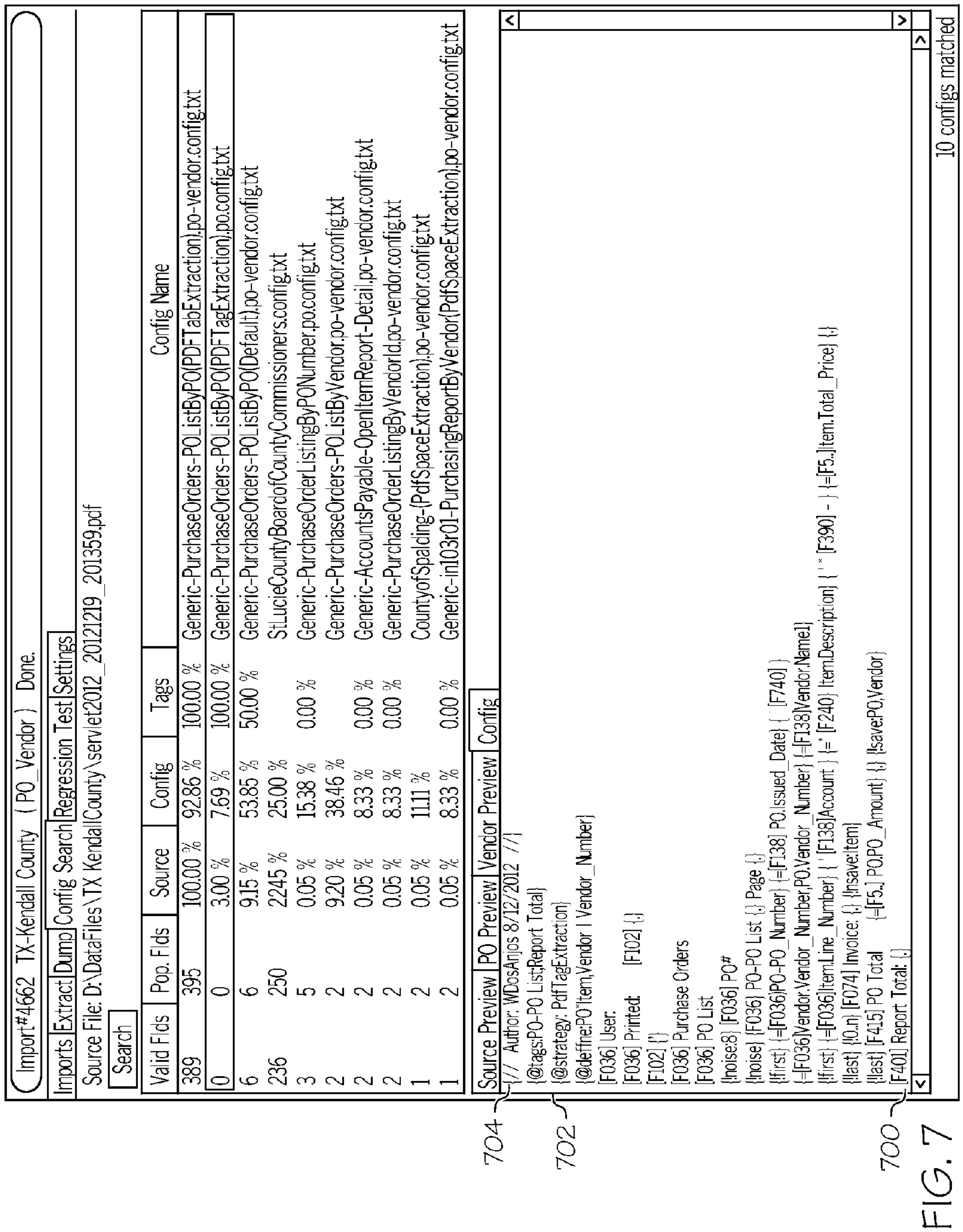

```
37    </P0>
38    <PC>
39      <PONumber>07—54588</PO_Number>
40      <Description>GRAVEL</Description>
41      <Issued Date>01/02/2008</Issued Date>
42      <PO_Arnount>20000.00000</PO_Amount>
43      <Req Number>07-54588</Req_Number>
44      <Delivery Date>01/07/2008</ Delivery Date>
45      <PO_Status>COMPLETED</PO_Status>
46      <Vendor_Number>01-2409</Vendor_Number>
47      <Items>
48        <Item>
49          <Line_Number>00001</Line_Number>
50          <Description>GRAVEL</Description>
51          <Total_Price>102.00000</Total_Price>
52        </Item>
53        <Item>
54          <Line_Number>00002</Line_Number>
55          <Description>GRAVEL</Description>
56          <Total_Price>102.00000</Total_Price>
57        </Item>
58        <Item>
59          <Line_Number>00003</Line_Number>
60          <Description>GRAVEL</Description>
61          <Total_Price>102.00000</Total_Price>
62        </Item>
63        <Item>
64          <Line_Number>00004</Line_Number>
65          <Description>GRAVEL</Description>
66          <Total_Price>102.00000</Total_Price>
67        </Item>
68        <Item>
69          <Line_Number>00005</Line_Number>
70          <Description>GRAVEL</Description>
```

FIG. 11

```
    <State>TX</State>
    <Zip>78006</Zip>
  </Vendor>
  <Vendor>
    <Vendor_Number>1000</Vendor_Number>
    <Name1>Bergheim General Store</Name1>
    <Address1>Box 4070</Address1>
    <City>Bergheim</City>
    <State>TX</State>
    <Zip>78004</Zip>
  </Vendor>
  <Vendor>
    <Vendor_Number>1001</Vendor_Number>
    <Naniel>Bergmann Lumber Company</Name1>
    <Address1>236 S Main St</Address1>
    <City>Boerne</City>
    <State>TX</State>
    <Zip>78006</Zip>
  </Vendor>
  <Vendor>
    <Vendor_Number>1002</Vendor_Number>
    <Name1>Boerne Auto Truck Supply Inc.</Name1>
    <Address1>32128 IH 10 West</Address1>
    <City>Boerne</City>
    <State>TX</ State>
    <Zip>78006</Zip>
  </Vendor>
  <Vendor>
    <Vendor_Number>1003</Vendor_Number>
    <Name1>Bohnert Lumber & Supply Inc</Name1>
    <Address1>P.O. Box 458</Address1>
    <City>Comfort</City>
    <State>TX</State>
    <Zip>78013</Zip>
```

FIG. 12

Import #4662 TX-Kendall County ( PO_Vendor ) Done.

Imports | Extract | Dump | Config Search | Regression Test | Settings

Source File: D:\DataFiles\TX Kendall County\servlet2012_20121219_201359.pdf

Search

| Valid Flds | Pop. Flds | Source | Config | Tags | Config Name |
|---|---|---|---|---|---|
| 389 | 395 | 100.00 % | 92.86 % | 100.00 % | Generic-PurchaseOrders-POListByPO(PDFTabExtraction).po-vendor.config.txt |
| 0 | 0 | 3.00 % | 7.69 % | 100.00 % | Generic-PurchaseOrders-POListByPO(PDFTagExtraction).po-vendor.config.txt |
| 6 | 6 | 9.15 % | 53.85 % | 50.00 % | Generic-PurchaseOrders-POListByPO(Default).po-vendor.config.txt |
| 236 | 250 | 22.45 % | 25.00 % | | StLucieCountyBoardofCountyCommissioners.config.txt |
| 3 | 5 | 0.05 % | 15.38 % | 0.00 % | Generic-PurchaseOrderListingByPONumber.po.config.txt |
| 2 | 2 | 9.20 % | 38.46 % | 0.00 % | Generic-PurchaseOrders-POListByVendor.po-vendor.config.txt |
| 2 | 2 | 0.05 % | 8.33 % | 0.00 % | Generic-AccountsPayable-OpenItemReport-Detail.po-vendor.config.txt |
| 2 | 2 | 0.05 % | 8.33 % | 0.00 % | Generic-PurchaseOrderListingByVendorId.po-vendor.config.txt |
| 1 | 2 | 0.05 % | 11.11 % | | CountyofSpalding-(PdfSpaceExtraction).po-vendor.config.txt |
| 1 | 2 | 0.05 % | 8.33 % | 0.00 % | Generic-int103r01-PurchasingReportByVendor(PdfSpaceExtraction).po-vendor.config.txt |

Source Preview | PO Preview | Vendor Preview | Config

| | |
|---|---|
| 4735 | Conference on Crimes Against Women |
| 3365 | HTS Voice And Data Systems |
| 3891 | Legend Refrigeration, LLC |
| 3170 | Capital City Leasing Inc |
| 1275 | The Boerne Star |
| 3840 | JP Morgan Chase Bank Na |
| 4517 | TASC-Client Invoices |
| 1100 | Alamo Iron Works |
| 1001 | Bergmann Lumber Company |
| 1002 | Boerne Auto Truck Supply Inc. |
| 1003 | Bohnert Lumber & Supply Inc |

10 configs matched

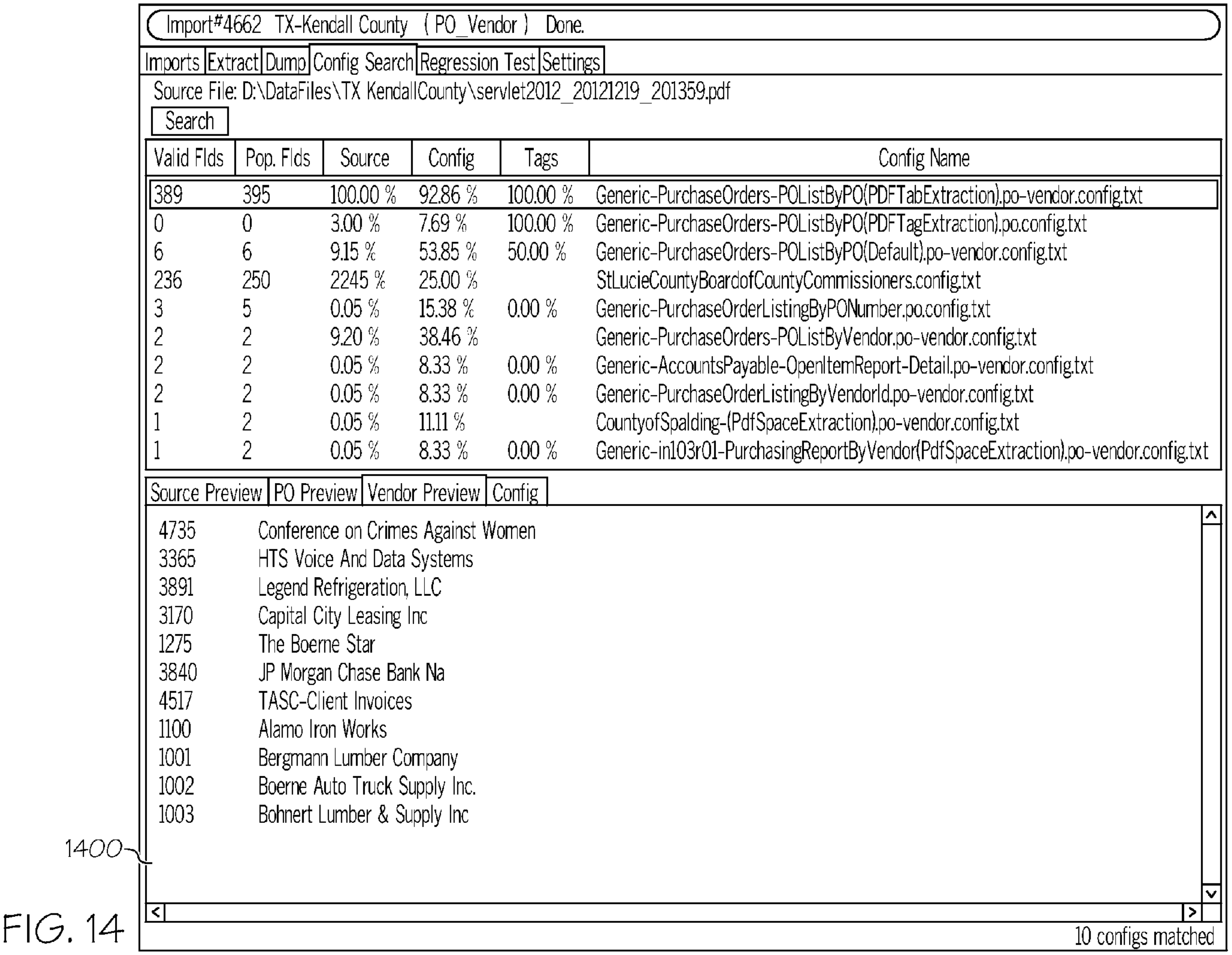

FIG. 14

| Search | Support |

Search: cell m6300 laptop  1702  [Go] ☐ Keep Filters

Search results for dell m6300 laptop

| Filter by                         Clear All | Purchase Orders | Spend Analytics (NEW) |

Showing 1 - 5 of 5 Purchase Orders    Per Page: [10▼] Sort: [Relevance ▼]

Keyword
● Include (AND)
○ Expand (OR)
○ Exclude (NOT)                    [Add]

☐ Palm Beach County School District                        PO#2008017893  ⎯1704
☐ Dell Computer K-12 Education              Issued on 1/30/2008 for $7,793.80
  Dell Precision M6300 Laptops
  Qty: 3 at $2,554.60
More Line Items Vendor Name #
☐ Dell Marketing Lp (2)
☐ Dell Computer K-12 Education (1)
☐ Dell Federal Systems Gp Llc (1)
☐ Pc Specialists (1)

☐ Smithsonian Institution                   PO#F08D000000153319-0-GS35F4076D  ⎯1706
☐ Dell Marketing Lp                         Issued on 7/8/2008 for $3,378.64
DELL LAPTOP - PRECISION M6300

Vendor State #
☐ TX (4)
☐ CA (1)

☐ Department of Commerce: Patent and Trademark Office  PO#D0C46PAPT0804026-0-D0C50PAPT0801001
☐ Pc Specialists                            Issued on 8/30/2008 for $2,390.00
DELL M6300 LAPTOP Vendor City #
☐ Round Rock,TX (4)
☐ San Diego, CA (1)

☐ Smithsonian Institution                   PO#F08P00000146210-0-F9836PB01333
☐ Dell Marketing Lp                         Issued on 4/4/2008 for $5,224.90
2 REPLACEMENT LAPTOPS FOR NASM PRECISION M6300

Vendor Zip
[     ] within [5 miles▼] [Go]

Agency Name #                      Clear
☐ Smithsonian Institution (3)
☐ Department of Commerce: Patent
  and Trademark Office (1)
☐ Palm Beach County School District (1)
☐ Department of Defense: 21st Theater
  Army Area Command (28)

☐ Smithsonian Institution                   PO#F08P033100000158237-0  ⎯1708
☐ Dell Federal Systems Gp Llc               Issued on 9/10/2008 for $3,996.50
HIGH-END LAPTOP/PORTABLE WORKSTATION.DELL PRECISION M6300, INTEL CORE 2 DUO X900, 2.80GHZ
800MHZ, 6M L2 CACHE, DUAL CORE (223-5283) LAPTOP.

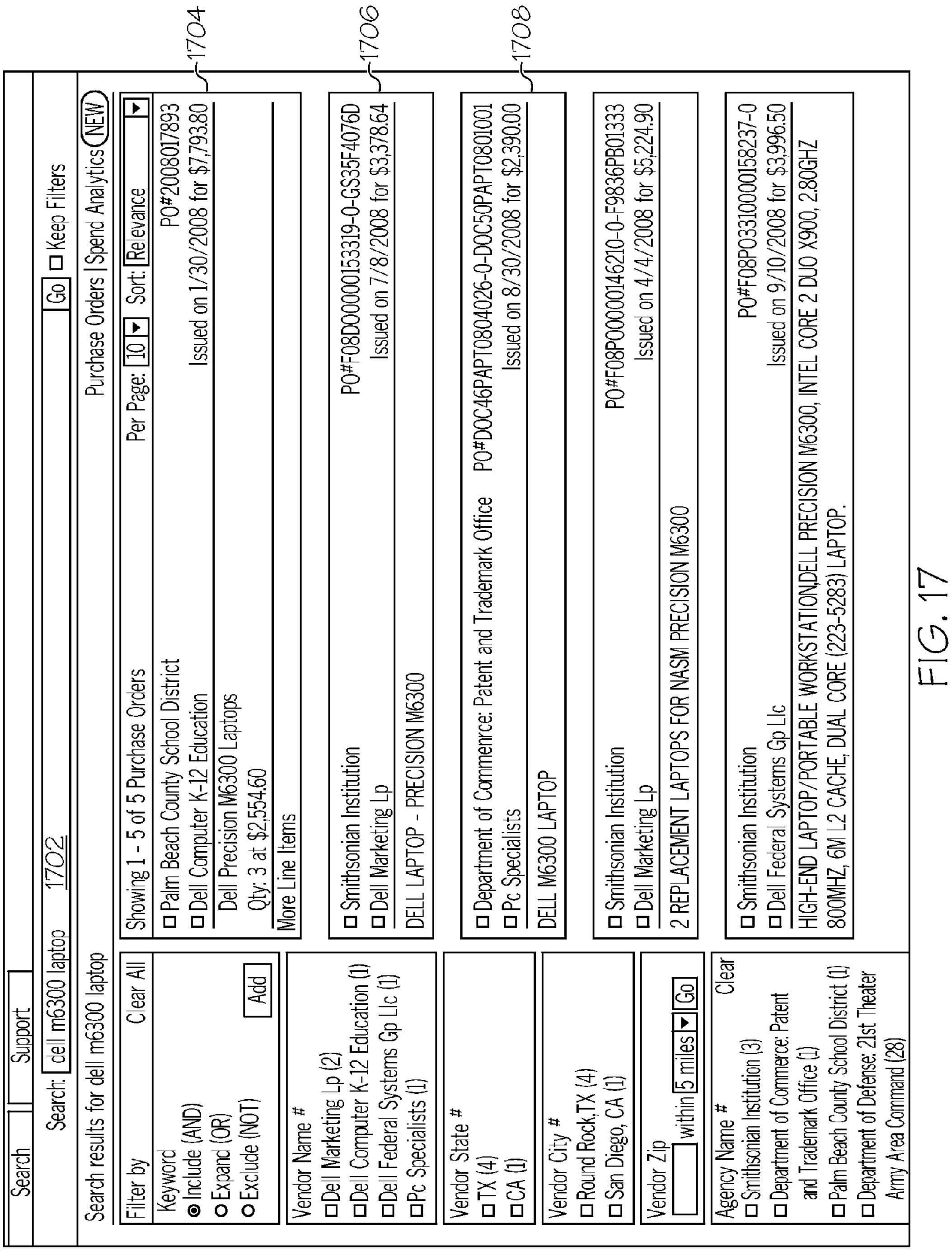

FIG. 17

Search | Support

Search: [ ] Go

Purchase Order

PO Number: 2008017893
Date: 1/30/2008

Agency

Palm Beach County School District
3340 Forest Hill Blvd # C-316
West Palm Beach, FL 33406-5869

Vendor

Dell Computer K-12 Education
Attn: Stacy Coleman
Round Rock, TX 78682

| Line | Item/Description | Quantity | Price | Measure | Amount |
|---|---|---|---|---|---|
| 1 | Dell Precision M6300 Laptops | 3 | $2,554.60 | | $7,663.80 |
| 2 | Dell Docking Stations | 3 | $390.00 | | $130.00 |
| | | | | Total | $7,793.80 |

Submit a Public Records Request

Purchase Order

Search | Support
Search: [_____] Go

Purchase Order

PO Number: D0C46PAPT0804026-0-D0C50PAPT0801001
Date: 8/30/2008

Agency
Department of Commerce: Patent and Trademark Office
1401 Constitution Avenue Northwest
Washington, DC 20230

Vendor
PC Specialists Technology Integration Group     _1902_
7810 Trade St.
San Diego, CA 92121
United States
http://www.tig.com

| Line | Item/Description | Quantity | Price | Measure | Amount |
|---|---|---|---|---|---|
| | DELL M6300 LAPTOP | | | | $2,390.00 |
| | | | | Total | |

Submit a Public Records Request

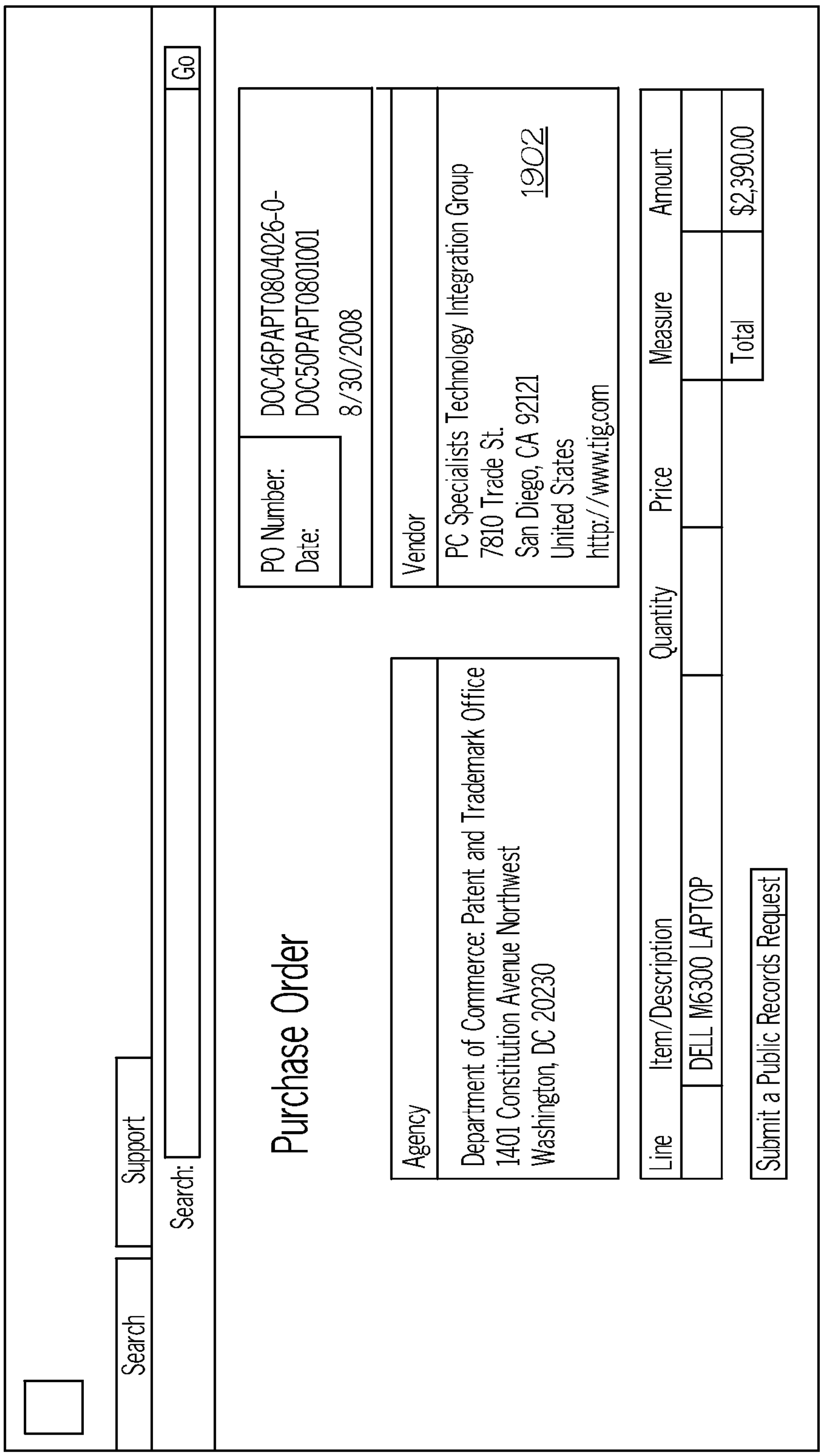

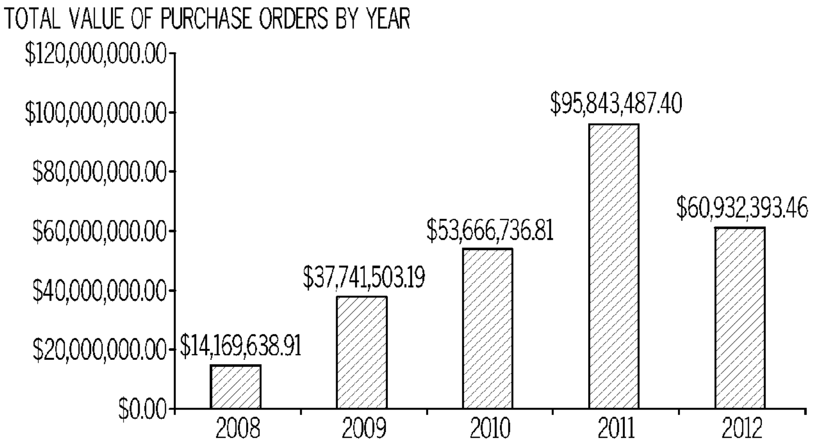

2014

RECENT PURCHASE ORDERS

| Date | Agency | State | Description | Amount |
|---|---|---|---|---|
| 11-14-2012 | Department of Veterans Affairs | DC | MHCL BHL | $0.00 |
| 10-19-2012 | Department of Commerce: Patent and Trademark Office | DC | FM-03 MOD 43 | $7,522,356.27 |
| 10-18-2012 | Department of Commerce: Patent and Trademark Office | DC | FM-08 MOD 0019 | $532,265.62 |
| 10-18-2012 | Department of Commerce: Patent and Trademark Office | DC | FM-01 MOD 0018 | $441,834.58 |
| 10-18-2012 | Department of Commerce: Patent and Trademark Office | DC | FM-02 MOD 0018 | $169,547.04 |
| 10-17-2012 | Department of Commerce: Patent and Trademark Office | DC | FM-11 SYSTEMS SUPPORT BRANCH MOD 0012 | $3,209,093.19 |
| 10-11-2012 | Department of Commerce: Patent and Trademark Office | DC | FUNDING-FM-12 ITOM SOFTWARE SERVICES SUPPORT-FUNDING THROUGH MARCH TRIPLE-I CONTRACT OPTION PERIOD: 9/23/12 THRU 9/22/13 | $822,793.27 |
| 10-3-2012 | Department of Commerce: Patent and Trademark Office | DC | FM-07 MOD 0016 | $189.793.46 |
| 10-1-2012 | Department of Commerce: Patent and Trademark Office | DC | FM-13 MOD 0008-FUNDING THROUGH MARCH 31,2013 ITOM DATABASE ADMINISTRATION SUPPORT TRIPLE-I CONTRACT OPTION PERIOD: 9/23/12 THRU 9/22/13 | $802,445.19 |
| 10-1-2012 | Department of Veterans Affairs | DC | VISTA DATA ANALYTICS | $0.00 |

FIG. 20B

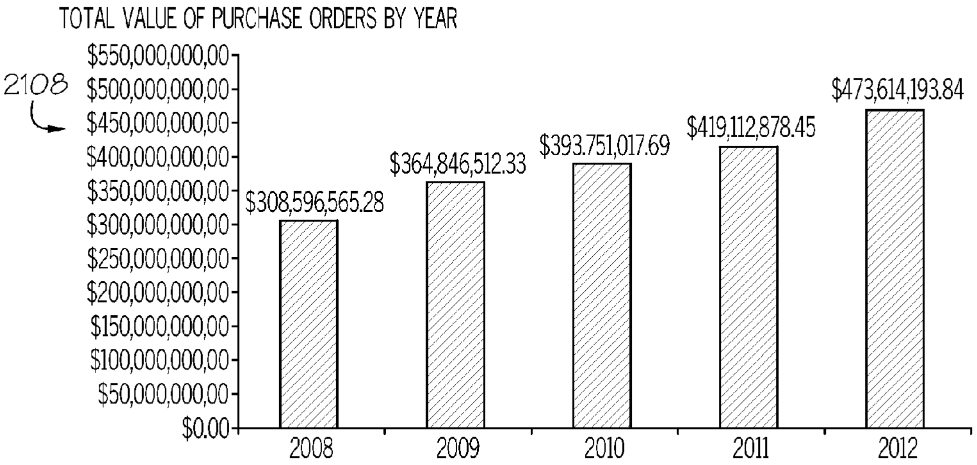

2110

RECENT PURCHASE ORDERS

| Date | Vendor | State | Description | Amount |
|---|---|---|---|---|
| 12-5-2012 | Hms Technologies Inc | WV | ACQUISITION SUPPORT SERVICES | $58,458.24 |
| 12-3-2012 | General Dynamics Information Technology Inc | VA | IGF::OT::IGF TECHNICAL SUPPORT FOR ERA VPN AND ERA VPN SUPPORT FOR UNIVERSAL LAPTOP PROJECT. | $292,615.00 |
| 12-3-2012 | Manhattan Strategy Group The Llc | NY | CONSULTANT SERVICES | $202,586.55 |
| 12-3-2012 | Research Investment Inc | OH | NON PATENT LITERATURE (NPL) | $60,000.00 |
| 12-3-2012 | Global Technologies Group Inc | VA | MAINTENANCE FOR RIMAGE PRODUCER III 7100N, 6100N, AND MAINTENANCE SOFTWARE SUPPORT. SEE ATTACHED FOR FURTHER DETAILS. | $20,202.00 |
| 12-3-2012 | Akima Global Services Llc | AK | IGF::CL::IGF ADMINISTRATIVE SUPPORT SERVICES | $1,905.12 |
| 11-30-2012 | Reed Technology And Information Services Inc | PA | PATENT DATA CAPTURE: PATENT PRINTING DATABASE | $3,911,920.76 |
| 11-30-2012 | Reed Technology And Information Services Inc | PA | PATENT DATA CAPTURE: PRE-GRANT PUBLICATION | $3,032,106.90 |
| 11-30-2012 | Reed Technology And Information Services Inc | PA | PATENT DATA CAPTURE - FRONT END PROCESSING - INDEXING AND SCANNING | $2,600,768.30 |
| 11-30-2012 | Addx Corporation | VA | COMPUTER PROGRAMMER (SR. COMPUTER ANALYST) 1/17/2012 - 9/30/2013 POP | $216,908.00 |

FIG. 21B

DATABASE AGGREGATION OF PURCHASE DATA

FIELD OF THE DISCLOSURE

This present disclosure is generally related to the field of database management and more particularly to the automated aggregation of purchase data acquired in multiple formats.

BACKGROUND

Goods and services are regularly provided by numerous different vendors to numerous different purchasing agencies. Purchasing agencies include a multitude of federal, state and local government agencies spending tax dollars to implement their public functions. Purchasing agencies also include entities in the private sector purchasing the goods and services used to implement their respective business models. Often times a first vendor will sell a first product to a first purchasing agency for a first price, and a second vendor will sell an identical first product to a second purchasing agency at a second albeit higher price. In the past, such sales information has been substantially inaccessible to parties not directly involved in the transaction.

However, if the second purchasing agent knew the price paid for the first item by the first purchasing agent before purchasing the item, then the second purchasing agent could negotiate a lower price, thereby saving money. Similarly, if the first vendor knew that the second purchasing agent had paid more for first product, then the first vendor could take steps to offer future product to the second purchasing agent at lower prices, thereby increasing sales. Furthermore, if the first product was manufactured by a first manufacturer and a second manufacturer produced a second comparable product, and the second manufacture knew which vendors were selling the first product along the corresponding quantities, prices and customers, then the second manufacturer could use that information to develop a marketing and distribution plan for the second product in order to better compete with the first manufacturer, thereby improving the competition between manufacturers.

In the private sector, business transactions between vendors and purchasing agencies are inherently confidential. The private sector is under no obligation to disclose such information. Consequently the availability of information regarding sales transactions between vendors and private sector purchasing agencies is generally unavailable. However, purchases made by government purchasing agencies are not confidential information and may be obtained through the Freedom of Information Act (FOIA) as well as state public records acts. Every month federal, state and local governmental purchasing agencies purchase vast amounts of goods and services. To facilitate these purchases, the government agencies generate an enormous number of purchase orders. Unfortunately, given the disparate nature of the numerous federal, state and local government agencies and the absence of standards in the structure of data affecting purchase orders, the data representing purchases may have significantly variable structures and formats. Furthermore, this data can be retained for a number of years and the structure or format of the data as well as the storage media used to retain the records can vary over time, even within the same governmental purchasing agency. Thus, there is a colossal amount of irregularly formatted data available on the purchase of goods and services by federal, state and local governments through the FOIA, and new data is constantly being generated with the purchase of new goods and services.

Big data is a collection of data sets so large and complex that it becomes difficult to process. While the management of government generated purchase order data may fall within the realm of big data, the availability of the analysis of such data would prove beneficial to the competitive procurement, distribution and manufacture of goods and services.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages in accordance with the present disclosure, in which:

FIG. 3 shows an example listing of purchase data files stored in purchase database.

FIG. 4 shows an example of a purchase order data file.

FIG. 6 and FIG. 7 show two examples of configuration files and resulting processing factors used for a best match determination.

FIG. 11 shows an example of a purchase order XML file.

FIG. 12 shows an example of a vendor XML file.

FIG. 14 shows an example of a vendor list.

FIG. 17 shows the results of a search request.

FIG. 19 shows a representation of information included in a second purchase order.

FIG. 20A and FIG. 20B show and example of a vendor report and analysis.

FIG. 21A and FIG. 21B show and example of a purchasing agent report and analysis.

DETAILED DESCRIPTION

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function.

Figure 1:
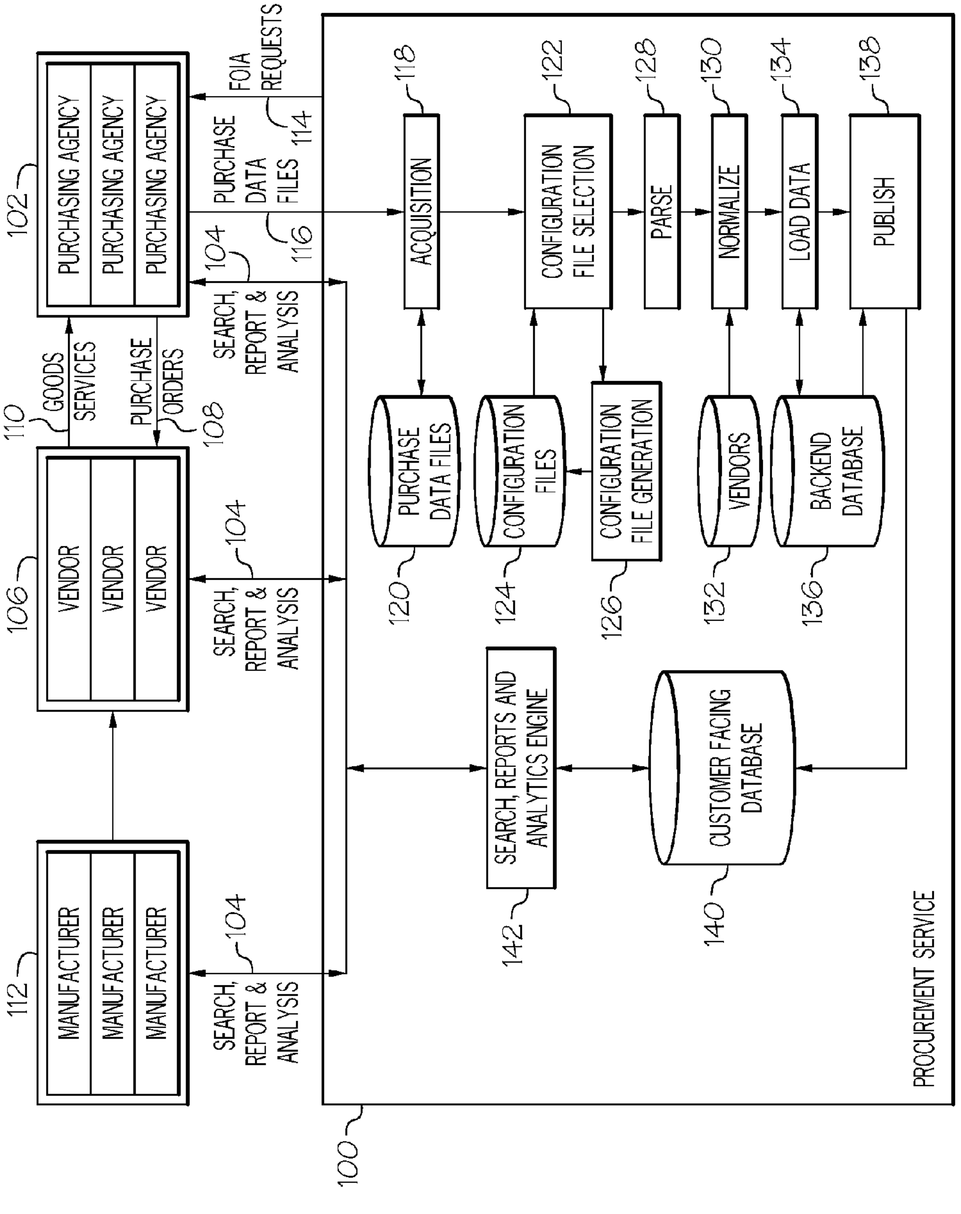
FIG. 1 shows a block diagram of a procurement service interfacing to purchasing agencies, vendors, and manufacturers.

FIG. 1 shows a block diagram of a procurement service interfacing to purchasing agencies, vendors, and manufacturers. Procurement service 100 aggregates purchase data acquired from local, state and federal government purchasing agencies, as well as private enterprise purchasing agencies 102 to provide search, reporting and analysis capabilities 104 to its customers and other interested parties. Search, reporting and analysis capabilities 104 are provided to the purchasing agencies 102 and to vendors 106, who in response to purchase orders (or Pcards or similar formats used for purchasing goods and services) 108 received from the purchasing agencies 102, provide goods and services 110 purchased by the purchasing agencies 102. Search, reporting and analysis services 104 are also provided to manufacturers 112 who provide at least some of the goods and services 110 distributed by the vendors 106. Search, reporting and analysis services 104 may also be provided to other interested parties.

While private enterprise purchase agencies such as corporations and other business entities may have a right to keep their purchase data confidential, governmental agencies release such information in response to Freedom of Information Act (FOIA) requests as well as state public record requests 114. Procurement service 100 sends periodic FOIA requests 114 to government purchasing agencies for purchase data files. Procurement service 100 may also solicit the provision of purchase data files from private enterprise purchase agencies. Purchase data files 116 are then received from the purchase agencies 102 by acquisition module 118. Purchase data files include information about purchases made by a purchasing agency 102 and may include information about the purchasing agency, information about the vendor, information about the purchase such as a descriptions, quantities, unit prices total price, and transaction data such as dates and delivery locations.

There is no required format or standard for purchase data files, so every purchasing agency can potentially have a different format for purchase data files. However, instead of developing their own unique purchase data file formats, some purchasing agencies may utilize one of a multitude of different third party business process management systems that include purchasing management applications which provide purchase order generation, invoice tracking and accounting of purchases. Purchase data files generated by such third party applications may further include tags indicative of the third party purchase management application utilized by the purchasing agency to generate the purchase data files. Thus, purchase data files received from several different purchasing agencies may have a known format, even though the purchasing agencies operate independently, because a common third party application is used to generate the purchase data files. The tags help identify if the purchase order data was generated by a known third party application and thus indicate a potential format of the data.

Purchase order data files 116 may be received by acquisition module 118 through multiple types of transport, and recorded on multiple different media formats within a multitude of different file types and using a multitude of different data formats. Acquisition module 118 accepts the purchase data files 116 and stores the purchase data files in purchase data files database 120. Examples of different physical transports include US Post Office, FedEx, UPS and currier. Examples of different electronic transports include email, FTP, and web site uploading. Examples of different media include printed paper, CDs, DVDs and flash drives. Examples of different file types include one of csv, docx, excel, html, pdf, pipe separated, rtf, tab separated, text, text fixed and jpeg. Purchase data files 116 may include purchase orders, invoices and Pcards. Physical purchase data files received on a media such as paper are scanned and converted into an electronic image file such as jpeg or pdf. Optical character recognition is then performed on image files whether received on paper or other electronic media. Electronic representations of purchase data files are then stored in purchase data files database 120 for processing by configuration file selection module 122.

Configuration file selection module 122 determines which of a multiplicity configuration files stored in configuration file database 124 to use for parsing a purchase data file by determining a best match between one of the configuration files and the purchase data file. Each configuration file includes a strategy for converting a purchase data file into an intermediate text file and fields for arranging the intermediate text file into an intermediate data file for best match selection and an annotated data file, such as an XML file for aggregation into a backend database. It should be appreciated that there may be at least one text conversion strategy for each file type. Furthermore, because of the peculiarities of pdf files, it should be further appreciated that multiple pdf text conversion strategies may be implemented. Configuration files are stored configuration file database 124. Generation of configuration files may be a manual process or facilitated through configuration file generation module 126. Since the configuration file is used to process the intermediate text file into an intermediate data file, a best match may be determined by the amount of processing done for each configuration file, including the amount of the intermediate text file processed and the amount of the configuration file processed as well as the amount and validity of information in the intermediate data file processed from the intermediate text file. If the best match between an intermediate text file and a configuration file does not produce minimal acceptable data, then the configuration file generation module can be used to either modify an existing configuration file or generate a new configuration in order to better process the purchase data file and intermediate text file.

Parsing module 128 parses the intermediate text file into an intermediate annotated data file, such as an XML file, using the best match configuration file selected by the configuration file selection module 122. The intermediate text file is parsed into the intermediate annotated data file having a series of tagged elements with corresponding attributes. The annotated intermediate data file is then further processed by normalizer module 130. Normalizer module 130 assures a uniform format of various elements including dates, phone numbers, addresses, zip codes, item counts and dollar amounts. Furthermore, normalizer module 130 calculates missing numeric fields such as item numbers, individual prices and total prices. Also, normalizer module 130 accesses a vendor database 132 having a multiplicity of formats associated with a multiplicity of vendor names in order to standardize the vendor name data of the intermediate annotated data file and associate a geo-tag indicative of a location of the vendor.

Load data module 134 then loads the normalized intermediated annotated data file into the backend database 136 which is aggregated with prior information from multiple purchase data files processed by procurement service 100. Publish module 138 then accesses the backend database 136 to update the customer facing database 140. The publication of new data includes adding new data processed from the purchase order data as well as updates to existing data, the updates being in response to more recent information received with the new purchase order data files. These modules provide for the automated aggregation of data into the customer facing database.

Search, reports and analytics engine 142 then access the customer facing database 140 to provide purchasing agencies 102, vendors 106 and manufacturers 112 with requested search, reports and analysis information 104 based upon the customer facing database 140. It should be appreciated that the procurement service 100 constantly receives a significant volume of purchase data files 116, the processing used to aggregate the new data occupies a significant amount of computational resources and database access bandwidth. Furthermore, the procurement service 100 receives a significant volume of requests for searches, reports and or analytics from customers 102, 106, 112 and other potential customers, the engine 142 that accesses customer facing database 140 also occupies a significant amount of computational resources and database access bandwidth. One advantage of separating the customer facing database 140 from the backend database 136 is that the interference between the processes is significantly reduced. Thus, customer inquiries that require access to the customer facing database will not be delayed by the processing of purchase order data files.

It should be appreciated that the purchase data files database 120, the configuration files database 124, the vendor database 132, the backend database 136, and the customer facing database 140 may be locally stored on one or more servers operated or housed within facilities of the procurement service 100. Alternately, one or more of the databases may be hosted off site by database storage services including cloud based storage services. A single vendor may have a multitude of textual representations, spelling or abbreviations depending upon how a purchasing agency chooses to record the vendor. The vendor database 132 keeps a current and up to date record of all potential vendors and the various corresponding textual representations or may alternately determine a most appropriate match between a textual representation and a corresponding vendor. The vendor database 132 may also provide a common tag indicative of the vendor as well as a geo-tag indicative of the location of the vendor. The vendor database 132 may be maintained internally, or may be maintained by an external independent concern in the practice of keeping business related records of business entities such as vendors, or may be distributed where the vendor database is maintained internally with some updates received from one or more of the external independent concerns.

It should also be appreciated that a convenient way for acquisition module 118 to receive purchase data files 116 is to provide a website for the purchasing agencies 102 to directly upload the purchase data files. The website may be hosted on one or more servers operated or housed within facilities of the procurement service 100. Alternately, the website may be hosted off site by a website hosting service. Purchasing agency validation may be required by the website in order to avoid processing fraudulently submitted purchase data files and potentially corrupting the integrity of the customer facing database. Purchasing agency validation may be done by any of a number of known techniques including a resolving process for requiring a secure connection or requiring purchase data files to be received from a known IP address.

It should be further appreciated that acquisition module 118, configuration file selection module 122, parsing module 128, normalization module 130, load data module 134, publish module 138 and search, reports and analytics engine module 142 may be implement by one or more programs stored on a durable, non-transitory computer readable storage medium and operated on one or more servers. The one or more servers may be operated or housed locally within facilities of the procurement service 100. Alternately, one or more of the modules may be implemented off site by virtual server services including cloud based server services.

Figure 2:
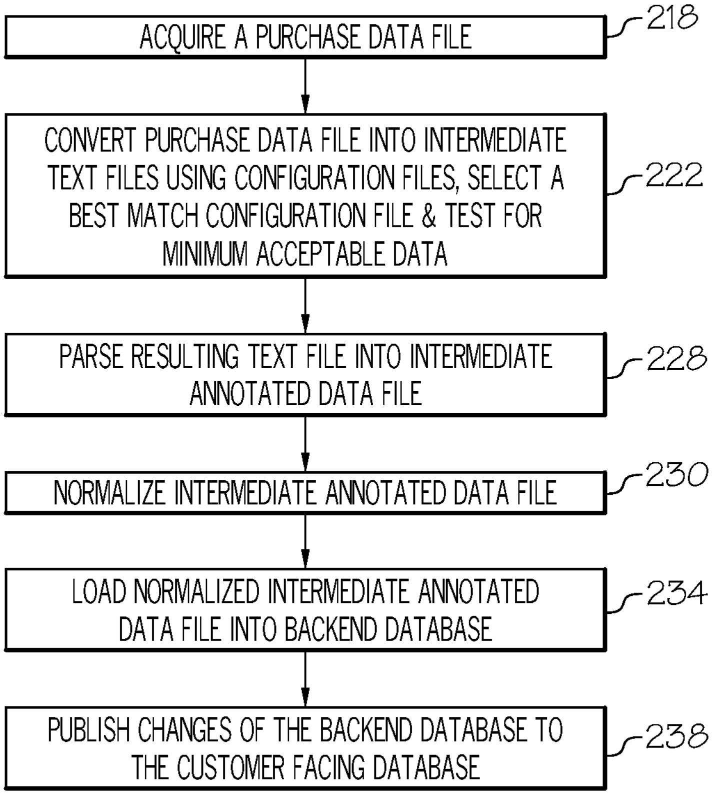
FIG. 2 shows a flow diagram of a process for aggregating purchase data into the customer facing database.

FIG. 2 shows a flow diagram of a process for aggregating purchase data into the customer facing database. First, a purchase data file is acquired at step 218, which has a correspondence with the operation of acquisition module 118. Purchase order data files 116 may be received by acquisition module 118 through multiple types of transport, and recorded on multiple different media formats within a multitude of different file types and using a multitude of different data formats. Electronic representations of purchase data files are stored in purchase data files database 120 for processing.

FIG. 3 shows an example listing of purchase data files stored in purchase database. By way of examples, files 4659, 4660, 4661, 4662 and 4663 are pdf files received from Kendall County, TX. File 4663 is a vendor file with description of the vendor for use with purchase order files 4659-4662. File 4662 is shown as selected. When purchase order file 4662 is processed, it is merged with its corresponding vendor file 4663 in order to facilitate its processing. Use of a common key can help facilitate the merger of the vendor and purchase order files.

FIG. 4 shows an example of a purchase order data file. The purchase order data file corresponds to file 4662 selected in FIG. 3.

After a purchase data filed is acquired and stored, step 222 of FIG. 2 is performed. The processes of step 222 are functionally equivalent to operation of configuration file selection module 122. In this step, purchase data files are converted into intermediate text files using configuration files strategies, then a best match configuration file is selected and the corresponding intermediate text file is tested for a minimum level of acceptable data.

Figure 5:
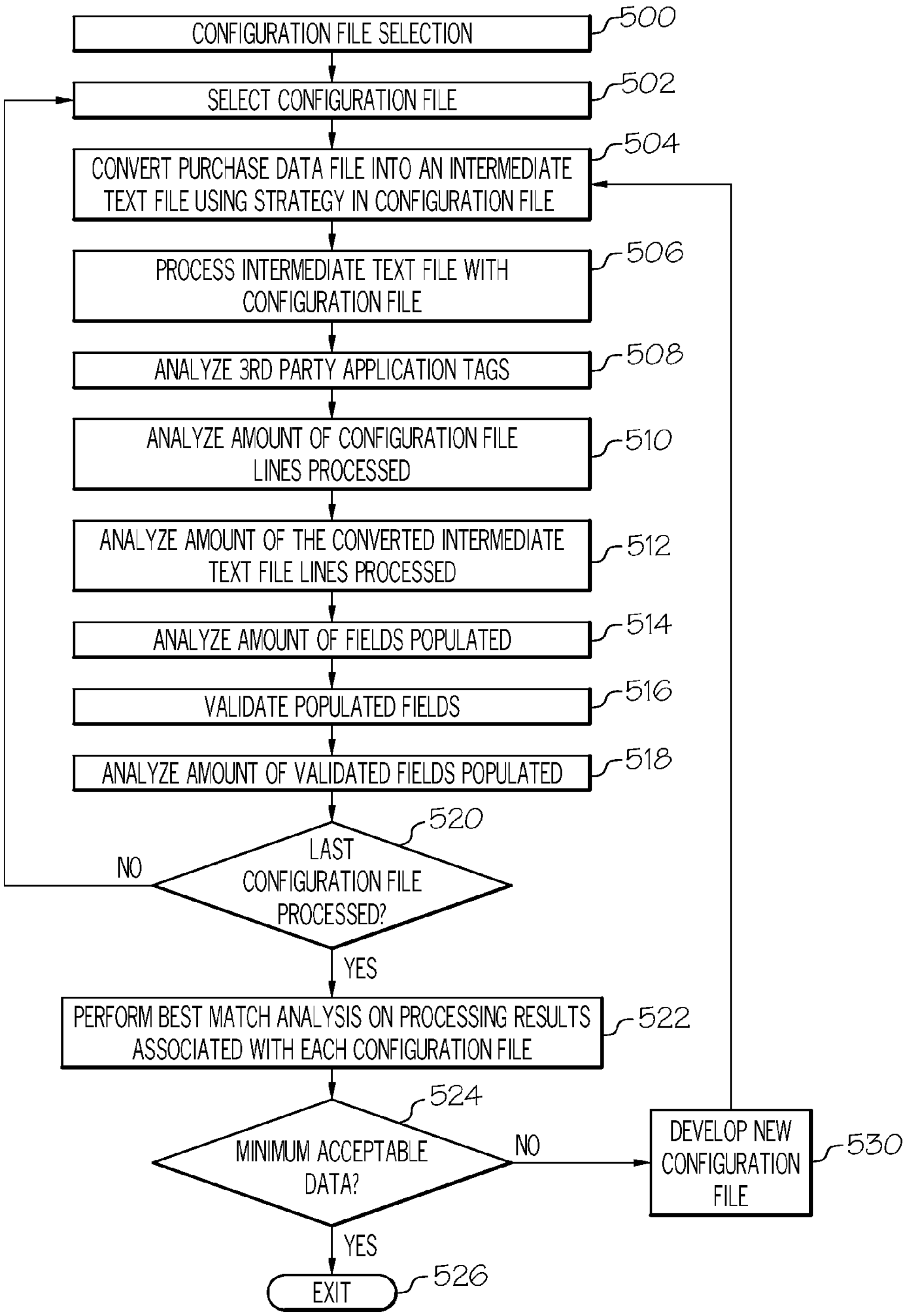
FIG. 5 shows a flow diagram of a configuration file selection process.

FIG. 5 shows a flow diagram of the configuration file selection process. FIG. 5 shows selecting a best match configuration file of the multiplicity of configuration files determined to have a higher level of processing results. The configuration file selection process is included in step 222 of FIG. 2 and the function of configuration files selection module 122 of FIG. 1. Configuration file database 124 may store a significant number of configuration files. An objective of the configuration file selection process is to determine a best match between one of the configuration files and the purchase order data file being processed.

FIG. 6 and FIG. 7 show two examples of configuration files and resulting processing factors used for a best match determination. Lines of instructions of the first configuration file are shown in box 600 and lines of instructions of the second configuration are shown in box 700. Boxes 600 and 700 show instruction lines for processing the lines of text of the intermediate text file into an intermediate data file having a plurality of fields.

The flow diagram of FIG. 5 is entered at step 500 and step 502 selects a configuration file, such as the configuration file of either FIG. 6 or FIG. 7, from the configuration file database 124. Step 504 then converts the purchase data file into an intermediate text file having lines of test using the text conversion strategy associated with the configuration file. Note that step 504 is in a loop and is executed a multiplicity of times, this results in the conversion of the purchase data file into a multiplicity of text files using a multiplicity of configuration files. Instruction lines 602 and 702 identify strategies associated with the configuration files of FIG. 6 and FIG. 7 respectively.

Figure 8:
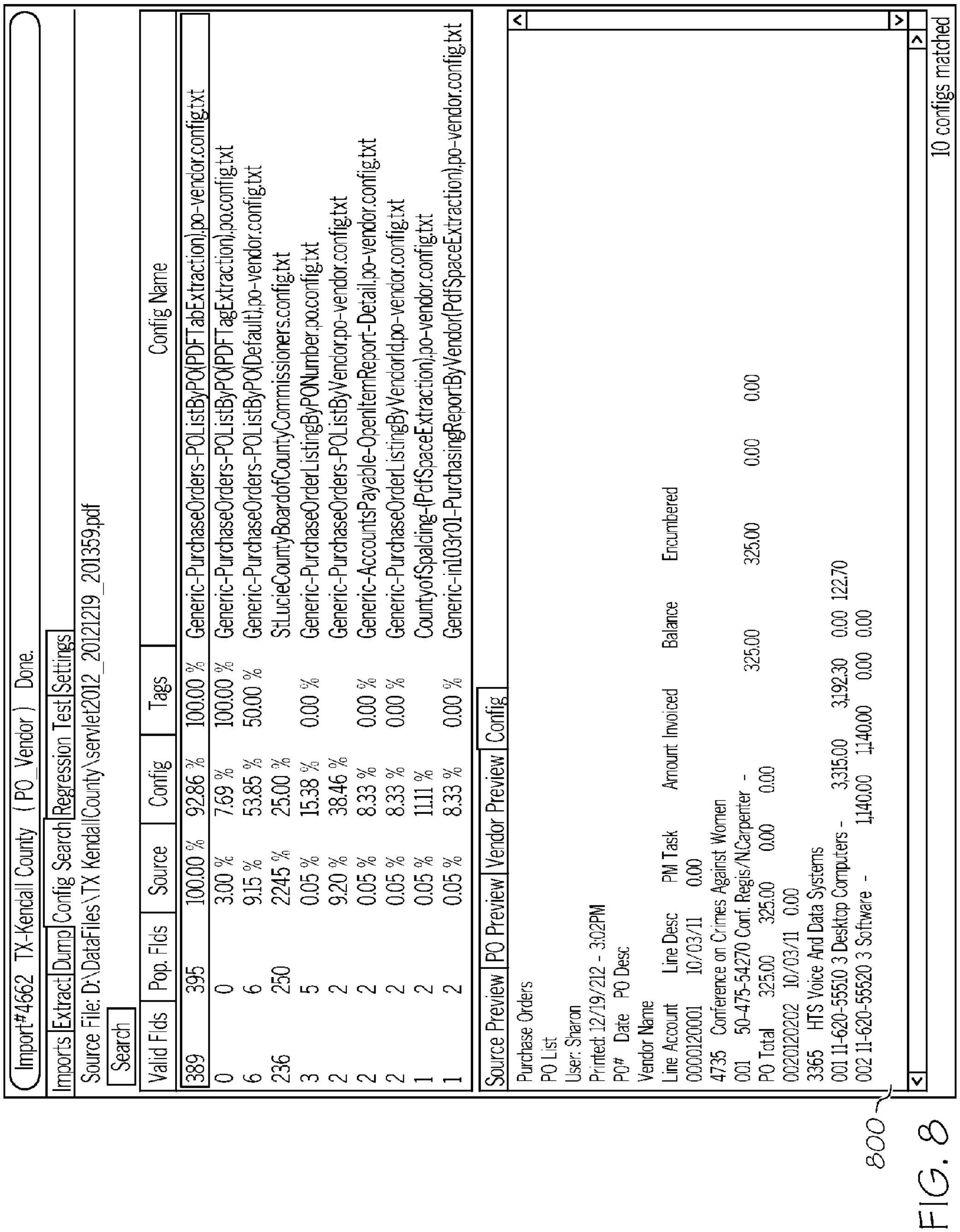
FIG. 8 shows an intermediate text file generated in response to a configuration file.

FIG. 8 shows an intermediate text file generated in response to a configuration file. Box 800 shows lines of text of the intermediate text file generated by the configuration file of FIG. 6 originating from the purchase data file of FIG. 4.

Step 506 of FIG. 5 processes the intermediate text file with the configuration file in order to perform an analysis and determine a best match configuration file. In a first embodiment, the entire intermediate text file is processed. In a second embodiment, only a portion of the intermediate text file is processed, for example, the first one thousand and last one thousand lines are processed. The second embodiment has the advantage of more rapidly finding a best match configuration file since the amount of processing of each intermediate text file is reduced. Step 508 of FIG. 5 analyzes the presence of third party application tags and other tags within the converted text file. Configuration file tag instruction lines are shown at 604 and 704 of FIG. 6 and FIG. 7 respectively which indicates that the configuration file includes a plurality of tag definitions indicative of a third party application used to generate purchase data files. Then step 510 analyzes the amount of configuration file instruction lines processed by step 506. Example configuration file instruction lines are shown at boxes 600 and 700 of FIG. 6 and FIG. 7 respectively. A configuration file not well matched to an intermediate text file will not tend to utilize a high number of configuration file instruction lines when processing the intermediate text file into the intermediate data file. Then the amount of converted lines of text of the intermediate text file utilized in the processing of step 506 is analyzed at step 512. Example lines of text of the intermediate text file are shown at box 800 of FIG. 8. A configuration file not well matched to an intermediate text file will not tend to generate a high number of converted lines of text. Step 514 then analyzes the number of fields defined by the configuration file populated by step 506 of processing. A configuration file not well matched to a intermediate text file will not tend to generate a high number of fields. Step 516 then validates the populated fields and step 518 analyzes the amount of populated fields that were validated. The configuration file includes field definitions for validating at least some of the fields of the intermediate file. Validation includes determining if numeric fields have numeric entries and other designated fields have entries of appropriate character. A configuration file not well matched to an intermediate text file will not tend to generate a high number of validated fields. If at step 520, not all of the configuration files were processed, then the flow diagram returns to step 502 to select the next configuration file for processing. Thus, steps 502-520 are performed until all of the configuration files in the configuration file database are processed. Steps 508-518 analyze various factors associated with processing of step 506 including how the intermediate text file was processed, how the configuration file was processed and an analysis of the intermediate data file produced by the processing. Then, the processing results are used for performing a best match analysis.

Step 522 then performs a best match analysis on the processing results associated with each configuration file. Upon determining a best match step 524 determines if the intermediate text file has a minimum acceptable data amount by testing the best match configuration file for a minimum level of acceptable data. Minimum acceptable data may include requiring population of purchase order number, vendor name, date, quantity, description and amount fields in the fields of the intermediate data file. If not then step 530 is used to generate a new configuration file. Step 530 implements substantially the same function as configuration file generator module 126 of FIG. 1. The flow diagram exits at step 526 if a best match with minimal acceptable data is found. Note than in other embodiments, automated step 524 of determining the presence of minimal acceptable data may be eliminated.

Figure 9A:
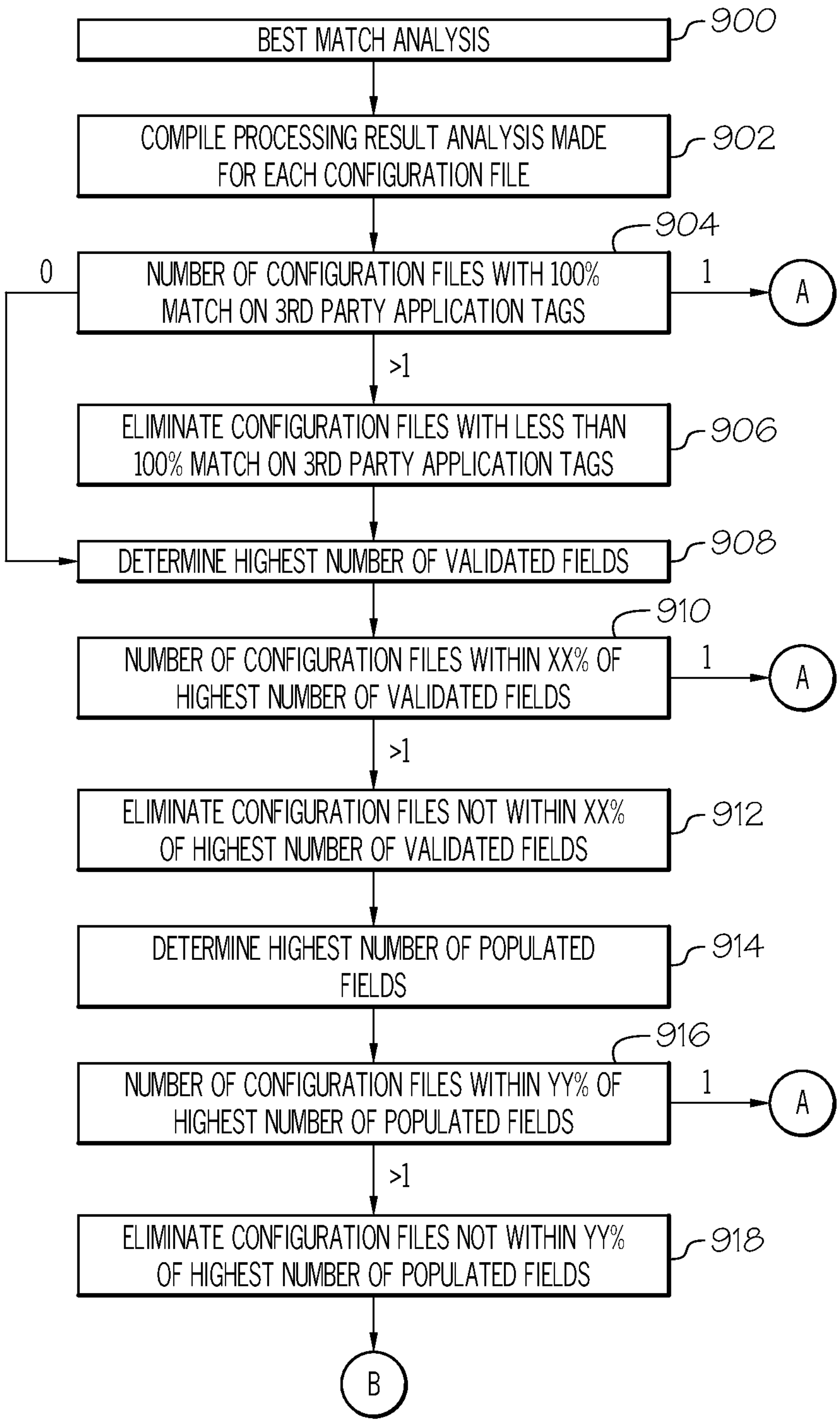
FIG. 9A and FIG. 9B show a flow diagram of a best match analysis.
Figure 9B:
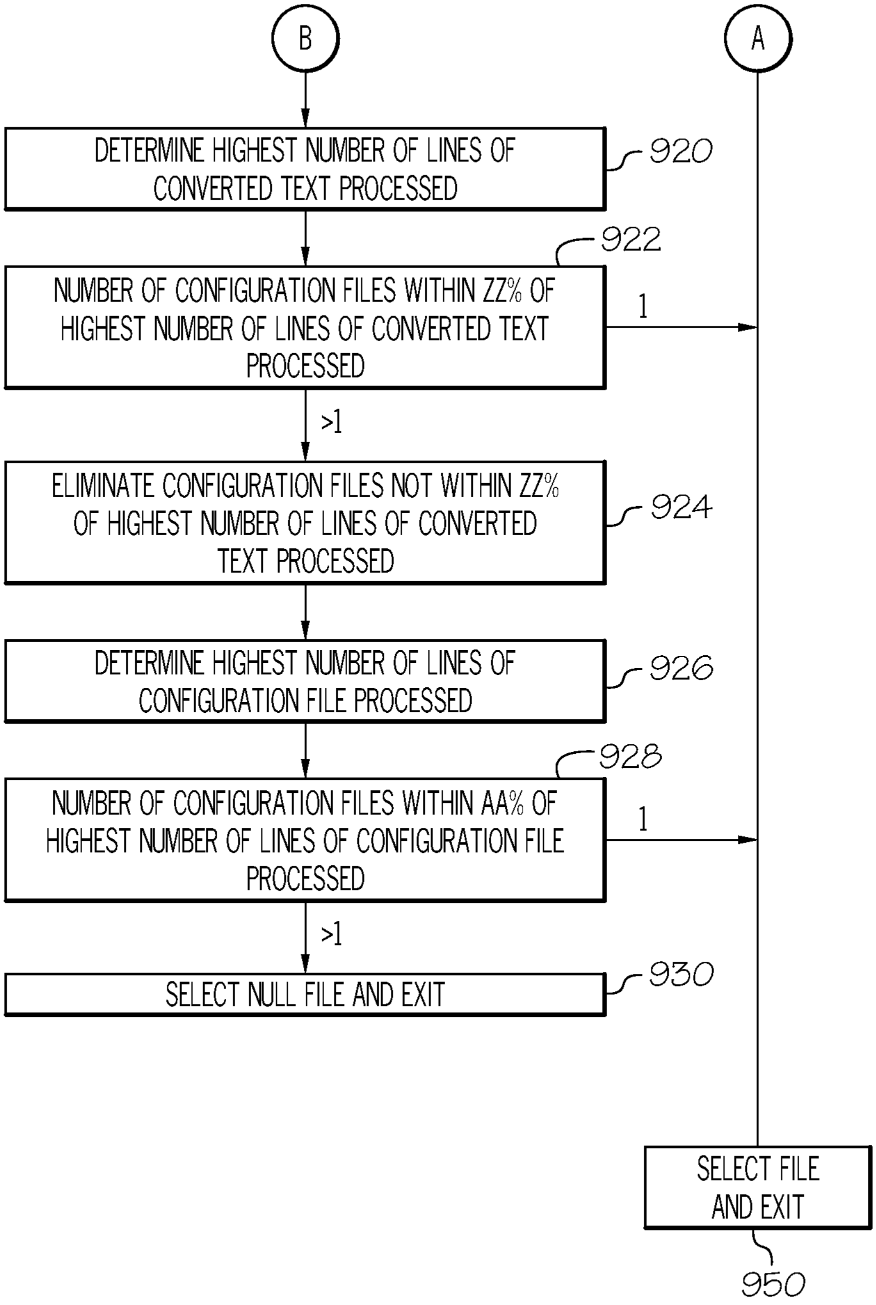

FIG. 9A and FIG. 9B show a flow diagram of the best match analysis of step 522 of FIG. 5. The flow diagram enters at step 900 and step 902 analyzes the processing result determinations of steps 508-518 of FIG. 5 made for each of the configuration files. Step 904 determines the number of configuration files having a 100% match with application tags. If only one configuration file has a 100% match then that configuration file is selected as the best match and the program exits at step 950. If more than one configuration file has a 100% match then configuration files with less than a 100% match are eliminated from the best match analysis at step 906 and step 908 proceeds to determine the configuration file with the highest number of validated fields. Step 908 is also entered from step 904 if no configuration file has 100% matching tags. By way of example, line 610 of FIG. 6 represents the configuration file of box 600 and line 612 represents the configuration file of box 700 of FIG. 7. Lines 620 represent other configuration files stored in the configuration file database. Columns 650, 652, 654, 656 and 658 represent compilations of the various processing result analysis of FIG. 5 and are used by further analysis step 902. Column 650 is an example of tag determination of step 904. Lines 610 and 612 show that both configuration files have a 100% tag match per step 904 and thus both configuration files would continue to be analyzed for a potential best match at step 908. However, configuration files of lines 620 have less than a 100% match are thus eliminated from further best match consideration at step 906. It should be appreciated that while a 100% threshold is used in step 904, that other thresholds and ranges are within the scope of the disclosure.

Of the configuration files remaining for best match determination, step 908 determines which configuration file has the highest number of validated fields. Then step 910 determines the number of configuration files having XX % or more of the highest number of validated fields. XX could be any value greater than zero and less than or equal to 100, and will be set to 90% for purposes of example. If only one file satisfies the determination of step 910 then that file is selected as the best match and the flow diagram exits at step 950. By way of example, column 652 shows that the configuration file of line 610 has three hundred and nine validated fields and the configuration file of line 612 has zero validated fields. Thus the configuration file of line 610 would be selected at step 910 as the best match in this example.

If more than one file satisfies the condition of step 910, then step 912 eliminates the configuration files not within XX % of the highest number of validated fields from consideration for a best match configuration file. Then step 914 determines the configuration file with the highest number of populated fields. By way of example, column 654 shows the number of populated fields for various configuration files. Then at step 916, configuration files are checked for those within having more than the YY % highest number of populated fields. For sake of example assume YY %=80%, but YY could be any value between one and one hundred. If only one configuration file satisfies the test of step 916 then that configuration file is selected to be the best match configuration file and the flow diagram exits at step 950. If more than one configuration file satisfies the condition of step 916, then step 918 eliminates configuration files not within YY % of the highest number of populated fields from consideration for a best match configuration file.

The files remaining for best match consideration are processed at step 920 to determine the highest number of lines of converted text processed by each configuration file. Step 922 determines if only one configuration file satisfies the test being within ZZ % of the highest number of lines of converted text. By way of example ZZ %=75%, but ZZ could be any value between one and one hundred. If so, that configuration file is selected as the best match configuration file and the flow diagram exits at step 950. Otherwise, if more than one file satisfies the test of step 922, then step 924 eliminates configuration files which do not pass the threshold of step 922 from further best match considerations. By way of example, column 656 of FIG. 6 shows a related and alternative determination for various configuration files. Column 656 shows the ratio, as a percentage, of lines of converted text over the total lines of text of the intermediate text file for each configuration file. In other embodiments, the percentage of column 656 could be analyzed in place of, or in addition to, the total number of lines converted text processed by the configuration file. Since the total number of lines of text of the intermediate text file may vary from configuration file to configuration file dependent upon the text conversion strategy of the configuration file, the percentages shown in column 656 add a different dimension to the analysis.

The files remaining for best match consideration are processed at step 926 to determine the highest number of lines of instructions of a configuration file utilized in the conversion of the intermediate text file to the intermediate data file. And step 928 determines if only one configuration file satisfies the test being within AA % of the highest number of lines of converted text. By way of example AA %=70%, but AA could be any value between one and one hundred. If so, that configuration file is selected as the best match configuration file and the flow diagram exits at step 950. Otherwise, if more than one file satisfies the test of step 922, then step 930 selects a null file for a best match configuration file and returns. Selecting a null file indicates that there is no automated selection of a configuration file and upon return, and thus step 524 will fail for the test for the presence of minimum acceptable data. By way of example, column 658 of FIG. 6 shows a related and alternative determination for various configuration files. Column 658 shows the ratio, as a percentage, of utilized instruction lines of the configuration processed over the total instruction lines of the configuration file. In other embodiments, the percentage of column 658 could be analyzed in place of, or in addition to, the total number of processed instruction lines of the configuration file. Since the total number of instruction lines each configuration may vary, the percentages shown in column 658 add a different dimension to the analysis.

After selection and test for the best match configuration file of step 222 of FIG. 2, step 228 parses the intermediate text file into an intermediate annotated data file, the processes of step 228 have a correspondence to the functionality of parser module 118 of FIG. 1.

Figure 10:
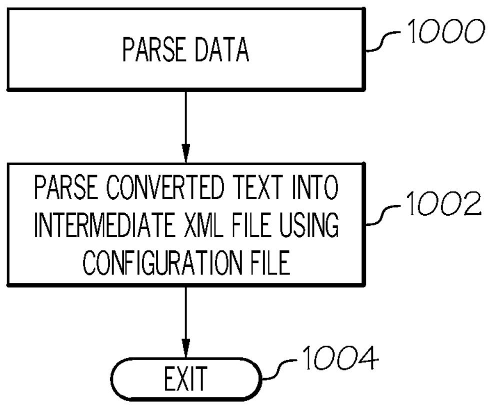
FIG. 10 shows a flow diagram of the parsing of the intermediate text file to an intermediate annotated data file.

FIG. 10 shows a flow diagram of the parsing of the intermediate text file to an intermediate annotated data file. The flow diagram of FIG. 10 functionally corresponds to the parsing module 128 of FIG. 1 and is entered at step 1000. Step 1002 parses the converted text file into the intermediate annotated data file, such as an XML file. The process includes capturing field values defined in the configuration file and output the result to intermediate annotated data file. Note that in one embodiment, only a portion of the intermediate text file is processed in step 506 in order to determine a best match configuration file. Whether or not a portion of the intermediate text file is processed at step 506, step 1002 processes the entire resulting intermediate text file into the intermediate annotated data file. The flow diagram then exits at step 1004.

FIG. 11 shows an example of a purchase order XML file and FIG. 12 shows an example of a vendor XML file.

After the parsing of step 228 if FIG. 2, step 230 normalizes the intermediate annotated data file. As described herein, normalization of the annotated data file puts the data in a better shape. Additional approaches for putting the data in a better shape includes acquiring data from external data sources. For example, vendors can provide their own data for eventual publication to the customer facing database. In this example, after authentication that data is being received from a vendor, the vendor can directly upload price lists and updates to vendor information. Furthermore, internet or other databases can be accessed to provide enhanced data.

Figure 13:
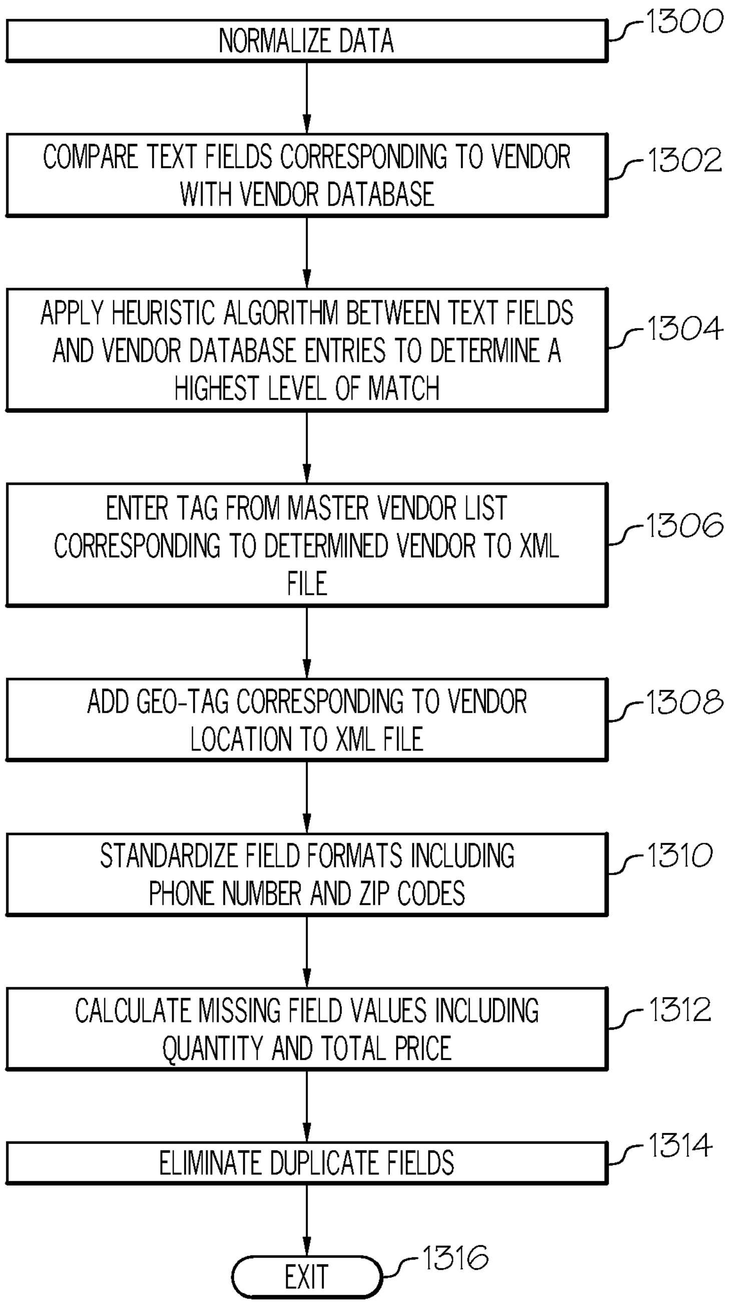
FIG. 13 shows a flow diagram of a normalization process.

FIG. 13 shows a flow diagram of the normalization process. The flow diagram of FIG. 13 is functionally equivalent to the functionality of the normalization module 130 of FIG. 1 and shows normalizing the intermediate annotated data file to produce a normalized intermediate annotated data file. The flow diagram enters at step 1300 and the process begins with the normalization of the vendor name. Since the name of a vendor may be entered into purchase orders in numerous different ways by numerous different purchasing agencies employing numerous different order entry personnel, the name of one particular vendor may occur in many different variations in different purchase data files. However for purposes of a standardized customer facing database, the various vendor entries are standardized to the one appropriate vendor. For example of the variations, the vendor name may be the actual name of the vendor including the entity type, an acronym of the vendor, or a trade name associated with the vendor. One example of differing descriptions of a common vendor would be "Research In Motion, Inc", or "Research in Motion, LTD", or "RIM", or "Blackberry". Other variations include differing representation of address including differing abbreviations or misspellings. Step 1302 compares the text fields corresponding to the vendor with the vendor database such as vendor database 132 of FIG. 1. Step 1304 then applies a heuristic algorithm to the text fields using the vendor database entries to determine a highest level of match and produce a best match vendor name. In one example, the level of match must exceed a minimum of 65%. Then, step 1306 enters a tag from the master vendor database corresponding to the determined vendor to the XML file, and step 1308 adds a geo-tag to the XML file indicating the location of the vendor. The geo-tag is often useful in identifying the location of the vendor on a map. It should be appreciated that some or all of the process of steps 1302-1308 may be performed internally, outsourced to external service providers or acquired from external service providers if additional information is appropriate to supplement the internal database. If such supplemental information is acquired, it can be incorporated into the internal database for future reference.

FIG. 14 shows an example of a vendor list. The first column of box 1400 shows a vendor tag or vendor number associated with a vendor shown in the second column of box 1400.

Step 1310 of FIG. 13 then standardizes information. In this type of normalization, numeric information such as phone number, zip codes, prices and quantities are represented in a common format. Also, information such as the representation of a state, whether or not a state is abbreviated, is standardized. Step 1312 then the reviews the purchase information and completes missing fields. For example, missing totals can be calculated or missing information such as quantities, unit prices or subtotals can be calculated. Finally, step 1314 checks for and eliminates duplication of entries and the flow diagram exits at step 1316.

After the intermediate annotated data file is normalized at step 230 of FIG. 2, it is loaded into the backend database at step 234. In another embodiment, steps 230 and 234 are performed in an opposite sequence where the intermediate annotated data file is first loaded into the backend database and then it is normalized.

Figure 15:
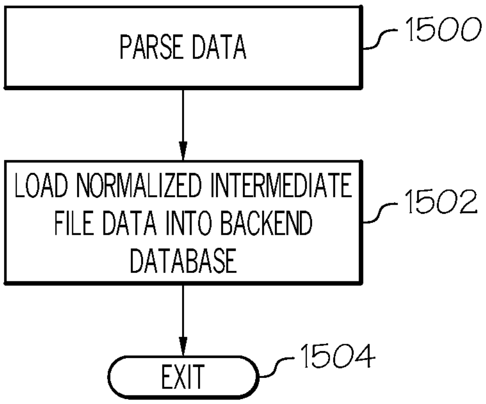
FIG. 15 shows a flow diagram of the data loading process.

FIG. 15 shows a flow diagram of the data loading process. The process of FIG. 15 is functionally equivalent to the load data module 134 of FIG. 1 and shows loading the normalized intermediate annotated data file into a backend database. The flow diagram enters at step 1500. Step 1502 loads the normalized intermediate data file into the backend database 136 and the data file is aggregated with other data files previously entered into the backend database. The flow diagram then exits at step 1504. In another embodiment, the normalization of steps 1302-1314 is performed after the load data of step 1502.

After the loading of step 234 of FIG. 2, step 238 publishes backend database changes to the customer facing database at step 238.

Figure 16:
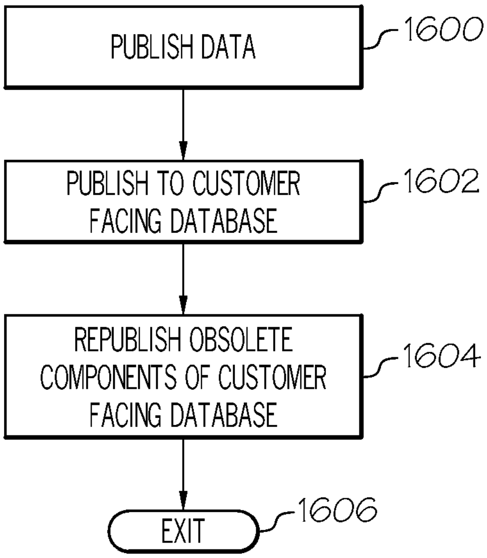
FIG. 16 shows a flow diagram of the process of publishing to the customer facing database.

FIG. 16 shows a flow diagram of the process of publishing to the customer facing database. The process of FIG. 16 is functionally equivalent to the functionality of publish module 138 of FIG. 1. The flow diagram enters at step 1600, and step 1602 changes to the backend database are published to the customer facing database. If the information processed by from the purchase data file is new information, then the step of publishing would add the information to the customer facing database. If the purchase data file had duplicative information relative to prior processed purchase data files, then the duplicate information would not be published. Furthermore, subsequently received purchase data files may update information from previously received purchase data files. In this case step 1604 republishes obsolete components of the customer facing database with updated information from a subsequent purchase data file. The flow diagram then exits at step 1606, and an automated method and apparatus for aggregating data into a customer facing database has been described.

The customer facing database 140 of FIG. 1 is accessed by search, reports and analytics engine 142 in order to generate search results, reports and analytics requested by users of the procurement service 100. The customers include purchasing agencies 102, vendors 106, manufacturers 112 and any other individuals or entities with access to the procurement service. By way of example, the following illustrations are provided. The illustrations represent portions of screen shots of a customer browser window of a customer of the procurement service 100 accessing the search, reports and analytics engine 142. The information used in the following examples is public information acquired through the Freedom of Information Act requests as well as state public records requests.

FIG. 17 shows the results of a search request. A search request for a "dell 6300 laptop" is entered at 1702. Box 1704 indicates a $7,793.80 purchase by the Palm Beach County School district and that three such laptops were purchased for $2,554.60 each. Box 1706 indicates that such a laptop was purchased by the Smithsonian Institution for $3,378.64. Box 1708 indicates that such a laptop was purchased by the Department of Commerce: Patent and Trademark Office for $2,390.00. A purchasing agent may decide to further investigate the lowest two purchases for the laptop, by clicking on the hyperlink associated with each corresponding purchase order. The two hyperlinks would be in the upper right corner of boxes 1704 and 1708.

Figure 18:
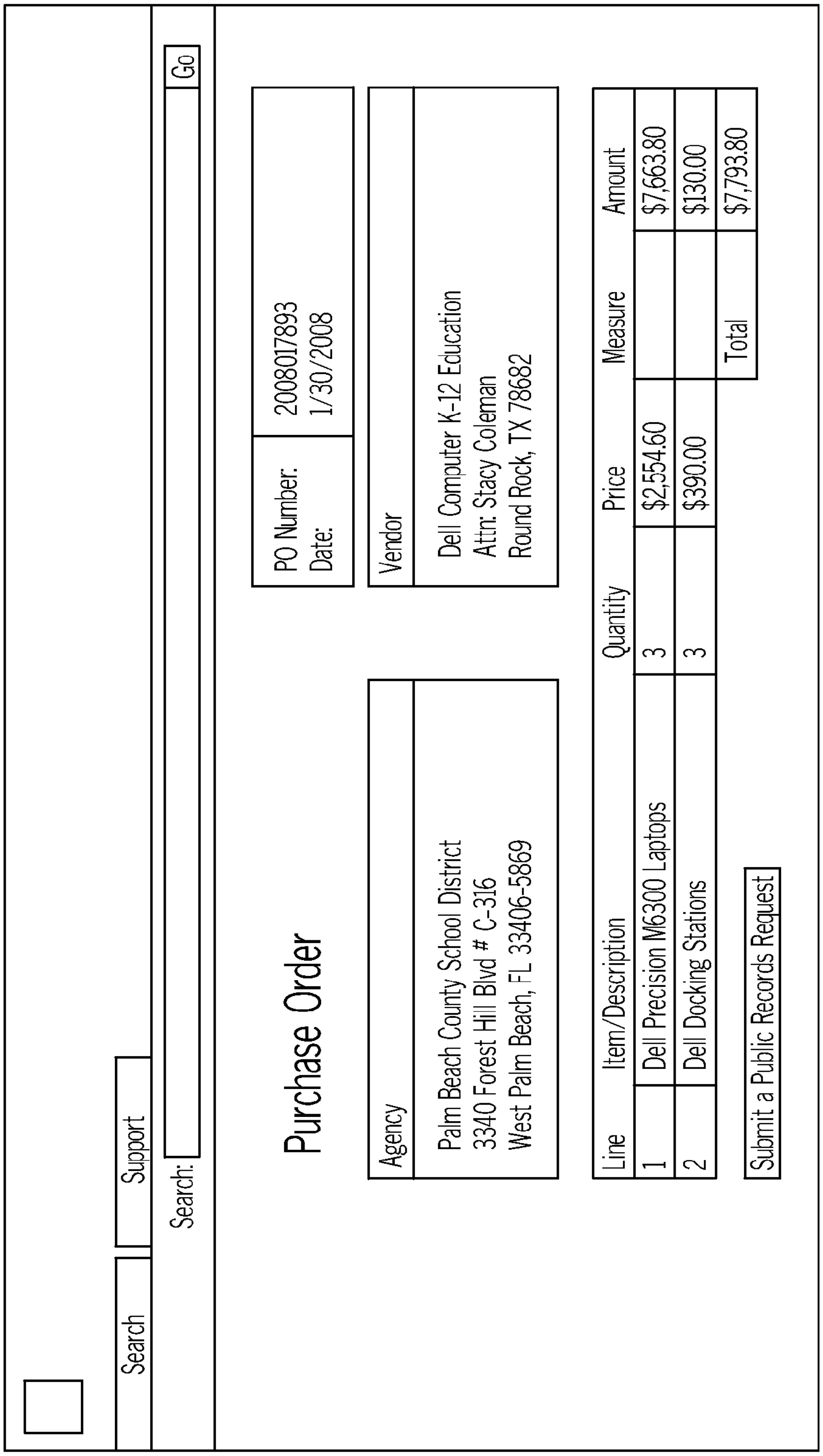
FIG. 18 shows a representation of information included in a first purchase order.

FIG. 18 shows a representation of information included in a first purchase order. This representation corresponds to the purchasing agent of box 1704, the Palm Beach County School District.

FIG. 19 shows a representation of information included in a second purchase order. This representation corresponds to the purchasing agent of box 1708, the Department of Commerce: Patent and Trademark Office. Examination shows that the Department of Commerce: Patent and Trademark Office was able to purchase the laptop at the best price. Box 1902 of the FIG. 19 shows the name and contact information of vendor that was able to provide the laptop at the lowest price, "PC Specialists Technology Integration Group". The vendor name is also a vendor hyperlink for providing additional information on the vendor.

Figure 20A:
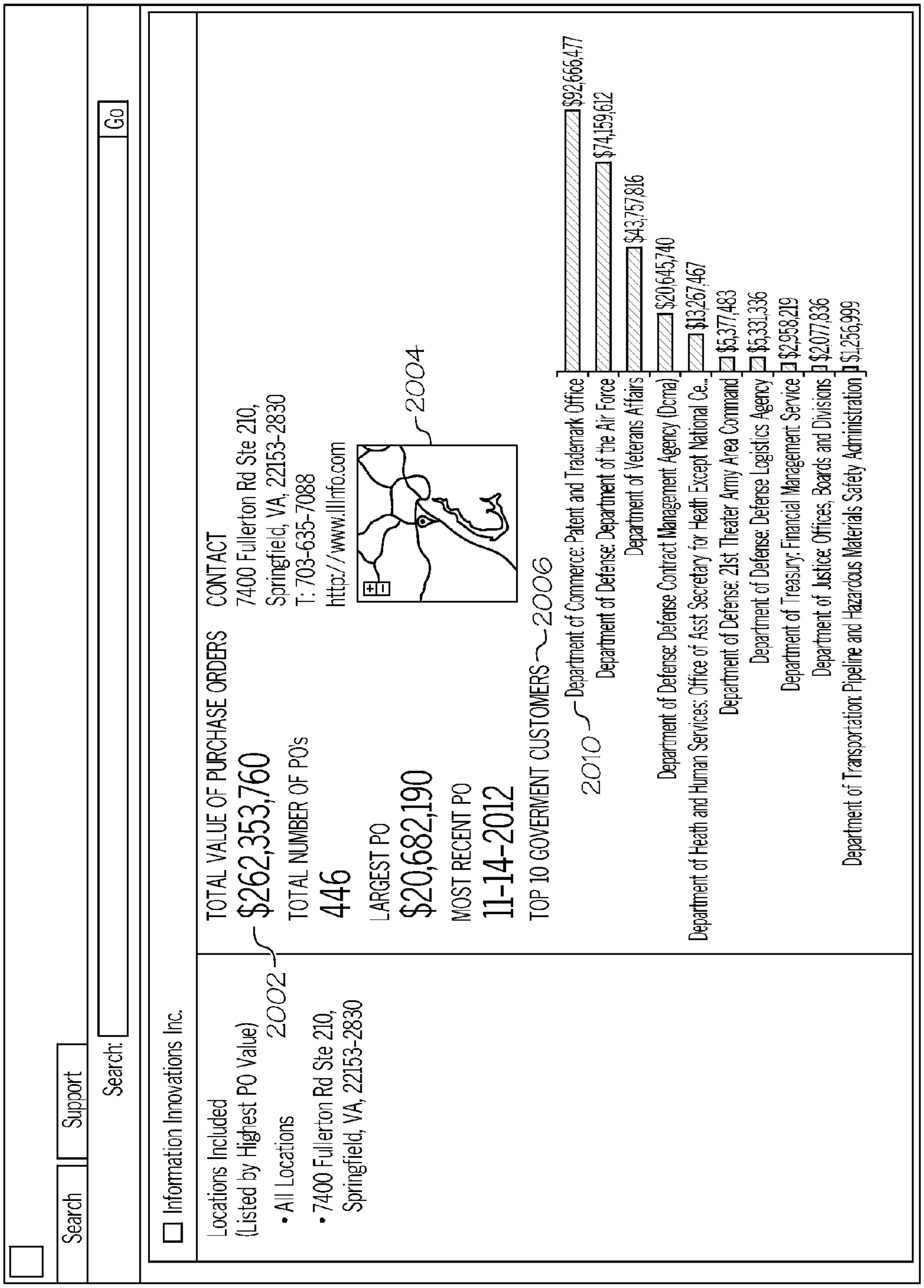

FIG. 20A and FIG. 20B show and example of a vendor report and analysis. By clicking the vendor hyperlink in box 1902 of FIG. 19, the report and analysis is provided. Item 2002 of FIG. 20A shows that over $262,000,000.00 of purchase orders are associated with the vendor, providing an indication of the amount of business done by the vendor. A map 2004 of the location of the vendor is also provided. The location is determined in response to the geo-tag associated with the vendor at step 1308 and published in the customer facing database. The vendor's top ten customers are shown at graph 2006. An examination shows that the top ten customers are agencies of the federal government, with the Department of Commerce: Patent and Trademark Office being the largest customer with a total value of $92,666,477 in purchase orders, at line 2010. Also shown in the report is the value of purchase order of the vendor by year at table 2012 and the most recent purchase order at table 2014. The information presented may help a perspective purchasing agency arrive at a level of confidence in dealing with the vendor. If the procurement service customer searching for analysis related to the laptop wanted more information on the largest customer of the lowest price vendor, then clicking a hyperlink is located at line 2010 in the form of the name of the purchasing agency, the Department of Commerce: Patent and Trademark Office would provide additional reports and analysis.

Figure 21A:
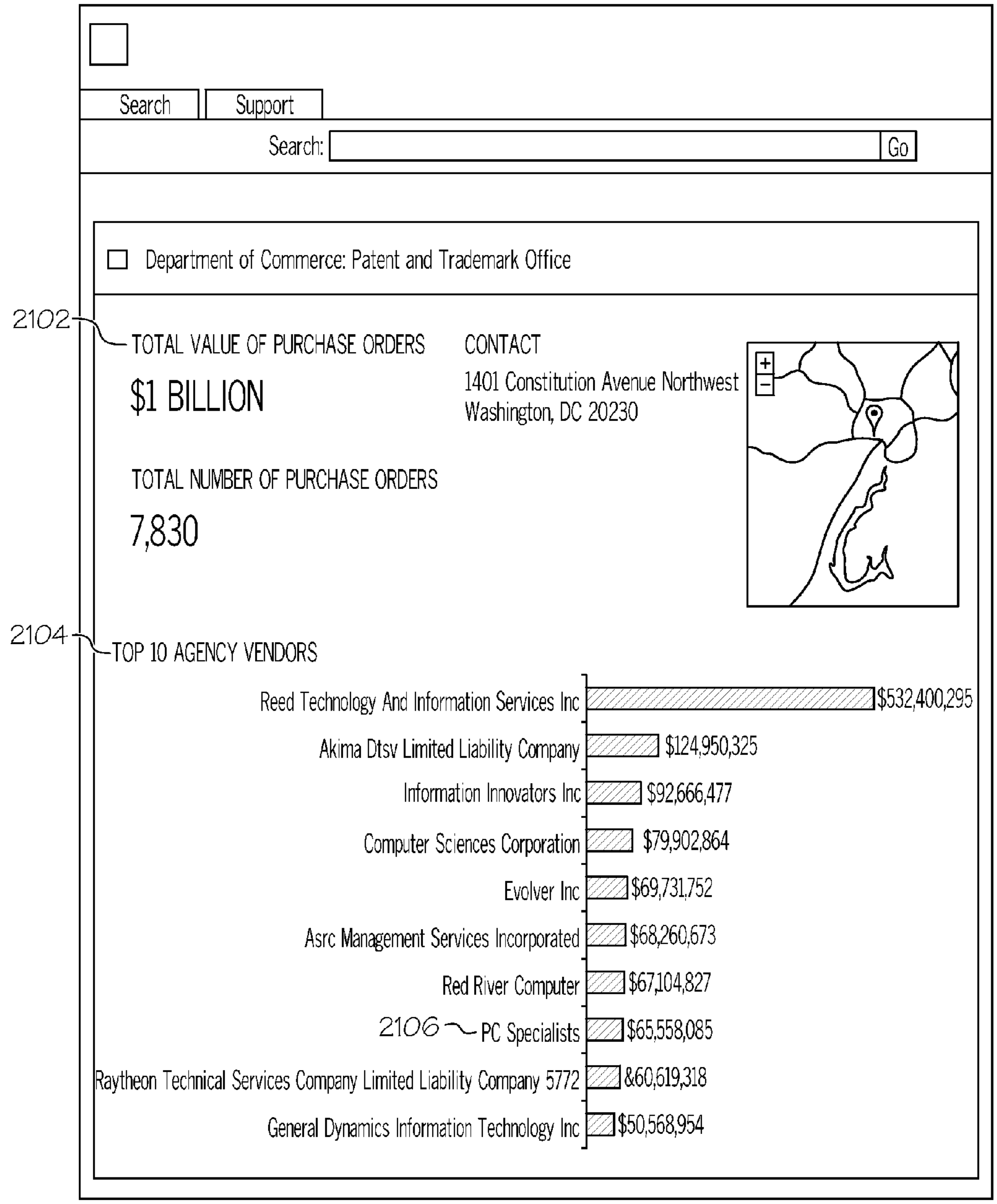

FIG. 21A and FIG. 21B show and example of a purchasing agent report and analysis. The total value of purchase order for the Department of Commerce: Patent and Trademark Office is shown as $1 Billion at area 2102 and the top ten vendors are shown at graph 2104. The vendor of FIG. 20A and FIG. 20B is shown as the eight largest vendor of the purchasing agent at line 2106. The report and analysis of the purchasing agent also shows the total value of purchase orders by year at graph 2108 and recent purchase orders at table 2110.

The terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms “controller”, “computer”, “server”, “client”, “computer system”, “computing system”, “personal computing system”, or “processing system” describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems.

The terms “computing system”, “computer system”, and “personal computing system”, describe a processing system that includes a user interface and which is suitably configured and adapted to implement one or more embodiments of the present disclosure. The terms “network”, “computer network”, “computing network”, and “communication network”, describe examples of a collection of computers and devices interconnected by communications channels that facilitate communications among users and allows users to share resources.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of computer instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, computer instructions, messages or message packets, and other computer readable information from the computer readable medium. The computer readable medium may include computer readable storage medium tangibly embodying non-volatile memory, such as read-only memory (ROM), flash memory, disk drive memory, CD-ROM, and other permanent storage. Additionally, a durable non-transitory computer readable storage medium may include tangibly embodied volatile storage such as RAM, buffers, cache memory, and network circuits. Furthermore, according to various other embodiments, the computer readable medium may comprise computer readable information in a transitory state medium such as a network link and/or a network interface, including a wired network or a wireless network that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An automated method of aggregating data for a database comprising:

acquiring a purchase data file from one of a multiplicity purchasing agencies;

converting the purchase data file into a multiplicity of text files using a multiplicity of configuration files, each configuration file having a strategy for converting the purchase data file into an intermediate text file having lines of text, instruction lines for processing the lines of text of the intermediate text file into an intermediate data file having a plurality of fields, and field definitions for validating at least some of the plurality of fields of the intermediate data file;

for each of the multiplicity of configuration files, processing the intermediate text file into the intermediate data file having the plurality of fields and analyzing the processing to produce processing results;

selecting a best match configuration file of the multiplicity of configuration files determined to have a higher level of processing results;

testing the best match configuration file for a minimum level of acceptable data;

parsing the intermediate text file of the best match configuration file into an intermediate annotated data file using the best match configuration file;

normalizing the intermediate annotated data file to produce a normalized intermediate annotated data file;

loading the normalized intermediate annotated data file into a backend database; and publishing changes in the backend database to a customer facing database, wherein the minimum level of acceptable data includes a population of at least one of the following fields: purchase order number, vendor name, date, quantity, description and amount.

2. The method according to claim 1 wherein the purchase data file is acquired in a file format including one of csv, docx, excel, html, pdf, pipe separated, rtf, tab separated, text, text fixed and jpeg.

3. The method according to claim 1 wherein each configuration file includes a plurality of tag definitions indicative of a third party application used to generate purchase data files and the analyzing the processing to produce processing results determines a number of the plurality of tag definitions occurring in the intermediate data file and the process results include the number of the plurality of tag definitions occurring in the intermediate data file, and the selecting the best match configuration file of the multiplicity of configuration files selects the best match configuration file in response to the number of the plurality of tag definitions occurring in the intermediate data file.

4. The method according to claim 1 wherein the analyzing the processing to produce processing results determines a number of fields populated in the intermediate data file and the process results include the number of fields populated in the intermediate data file, and the selecting the best match configuration file of the multiplicity of configuration files selects the best match configuration file in response to the number of fields populated in the intermediate data file.

5. The method according to claim 1 wherein the processing the intermediate text file into the intermediate data file further includes validating the fields using the field definitions, the analyzing the processing to produce processing results determines a number of validated fields populated in the intermediate data file and the process results include the number of validated fields populated in the intermediate data file, and the selecting the best match configuration file of the multiplicity of configuration files selects the best match configuration file in response to the number of validated fields populated in the intermediate data file.

6. The method according to claim 1 wherein the analyzing the processing to produce processing results determines a number of lines of text in the intermediate text file utilized by the processing of the intermediate text file into the intermediate data file and the process results include the number of lines of text in the intermediate text file utilized by the processing of the intermediate text file into the intermediate data file, and the selecting the best match configuration file of the multiplicity of configuration files selects the best match configuration file in response to the number of lines of text in the intermediate text file utilized by the processing of the intermediate text file into the intermediate data file.

7. The method according to claim 1 wherein the analyzing the processing to produce processing results determines a number of lines of instructions in a configuration file utilized by the processing of the intermediate text file into the intermediate data file and the process results include the number of lines of instructions in the configuration file utilized by the processing of the intermediate text file into the intermediate data file, and the selecting the best match configuration file of the multiplicity of configuration files selects the best match configuration file in response to the number of lines of instructions in the configuration file utilized by the processing of the intermediate text file into the intermediate data file.

8. The method according to claim 1 wherein each configuration file includes a plurality of tag definitions indicative of a third party application used to generate purchase data files, the processing the intermediate text file into the intermediate data file further includes validating the fields using the field definitions, the analyzing the processing to produce processing results determines a number of the plurality of tag definitions occurring in the intermediate data file, a number of fields populated in the intermediate data file, a number of validated fields populated in the intermediate data file, a number of lines of text in the intermediate text file utilized by the processing of the intermediate text file into the intermediate data file, and a number of lines of instructions in a configuration file utilized by the processing of the intermediate text file into the intermediate data file, the process result includes the number of the plurality of tag definitions occurring in the intermediate data file, the number of fields populated in the intermediate data file, the number of validated fields populated in the intermediate data file, the number of lines of text in the intermediate text file utilized by the processing of the intermediate text file into the intermediate data file, and the number of lines of instructions in the configuration file utilized by the processing of the intermediate text file into the intermediate data file, and the selecting the best match configuration file of the multiplicity of configuration files selects the best match configuration file in response to at least two of the number of the plurality of tag definitions occurring in the intermediate data file, the number of fields populated in the intermediate data file, the number of validated fields populated in the intermediate data file, the number of lines of text in the intermediate text file utilized by the processing of the intermediate text file into the intermediate data file, and the number of lines of instructions in the configuration file utilized by the processing of the intermediate text file into the intermediate data file.

9. The method according to claim 1 wherein the intermediate annotated data file includes vendor name data represented in one of a of a multitude of textual representations and the normalizing includes:

comparing the vendor name with a vendor database having a multiplicity of formats associated with a multiplicity of vendor names;

selecting a best match vendor name from the comparing using a heuristic algorithm; and inserting the best match vendor name into the annotated data file.

10. The method according to claim 1 wherein the testing the best match configuration file includes determining if the intermediate data file includes fields for purchase order number, vendor name and date.

11. An apparatus for automated aggregation of data for a database comprising:

an acquisition module for acquiring a purchase data file from one of a multiplicity purchasing agencies;

a configuration file selection means comprised within a computer system, the configuration file selection means for converting the purchase data file into a multiplicity of text files using a multiplicity of configuration files, each configuration file having a strategy for converting the purchase data file into an intermediate text file having lines of text, instruction lines for processing the lines of text of the intermediate text file into an intermediate data file having a plurality of fields, and field definitions for validating at least some of the plurality of fields of the intermediate data file;

for each of the multiplicity of configuration files, processing the intermediate text file into the intermediate data file having the plurality of fields and analyzing the processing to produce processing results;

the configuration file selection means further for selecting a best match configuration file of the multiplicity of configuration files determined to have a higher level of processing results;

a parsing module for parsing the intermediate text file of the best match configuration file into an intermediate annotated data file using the best match configuration file;

a load data module for loading the intermediate annotated data file into a backend database;

a normalization module for normalizing the intermediate annotated data file to produce a normalized intermediate annotated data file; and a publish module for publishing changes in the backend database to a customer facing database.

12. The apparatus according to claim 11 wherein the purchase data file is acquired in a file format including one of csv, docx, excel, html, pdf, pipe separated, rtf, tab separated, text, text fixed and jpeg.

13. The apparatus according to claim 11 wherein the configuration file includes a plurality of tag definitions indicative of a third party application used to generate purchase data files, the processing the intermediate text file into the intermediate data file further includes validating the fields using the field definitions, the analyzing the processing to produce processing results determines a number of the plurality of tag definitions occurring in the intermediate data file, a number of fields populated in the intermediate data file, a number of validated fields populated in the intermediate data file, a number of lines of text in the intermediate text file utilized by the processing of the intermediate text file into the intermediate data file, and a number of lines of instructions in the configuration file utilized by the processing of the intermediate text file into the intermediate data file, the process results include the number of the plurality of tag definitions occurring in the intermediate data file, the number of fields populated in the intermediate data file, the number of validated fields populated in the intermediate data file, the number of lines of text in the intermediate text file utilized by the processing of the intermediate text file into the intermediate data file, and the number of lines of instructions in the configuration file utilized by the processing of the intermediate text file into the intermediate data file, and the selecting the best match configuration file of the multiplicity of configuration files selects the best match configuration file in response to at least two of the number of the plurality of tag definitions occurring in the intermediate data file, the number of fields populated in the intermediate data file, the number of validated fields populated in the intermediate data file, the number of lines of text in the intermediate text file utilized by the processing of the intermediate text file into the intermediate data file, and the number of lines of instructions in the configuration file utilized by the processing of the intermediate text file into the intermediate data file.

14. The apparatus according to claim 11 wherein the intermediate annotated data file includes vendor name data represented in one of a multitude of textual representations and the normalization module is further for:

comparing the vendor name with a vendor database having a multiplicity of formats associated with a multiplicity of vendor names;

selecting a best match vendor name from the comparing using a heuristic algorithm; and inserting the best match vendor name into the annotated data file.

15. A durable, non-transitory computer readable storage medium comprising a computer program which instructs a computer to perform an automated method of aggregating data for a database, the method comprising:

acquiring a purchase data file from one of a multiplicity purchasing agencies;

converting the purchase data file into a multiplicity of text files using a multiplicity of configuration files, each configuration file having a strategy for converting the purchase data file into an intermediate text file having lines of text, instruction lines for processing the lines of text of the intermediate text file into an intermediate data file having a plurality of fields, and field definitions for validating at least some of the plurality of fields of the intermediate data file;

for each of the multiplicity of configuration files, processing at least a portion of the intermediate text file into the intermediate data file having the plurality of fields and analyzing the processing to produce processing results;

selecting a best match configuration file of the multiplicity of configuration files determined to have a higher level of processing results;

testing the best match configuration file for a minimum level of acceptable data;

parsing the intermediate text file of the best match configuration file into an intermediate annotated data file using the best match configuration file;

loading the intermediate annotated data file into a backend database;

normalizing the intermediate annotated data file to produce a normalized intermediate annotated data file; and publishing changes in the backend database to a customer facing database, wherein the minimum level of acceptable data includes a population of at least one of the following fields: purchase order number, vendor name, date, quantity, description and amount.

16. The computer program according to claim 15 wherein the purchase data file is acquired in a file format including one of csv, docx, excel, html, pdf, pipe separated, rtf, tab separated, text, text fixed and jpeg.

17. The computer program according to claim 15 wherein a configuration file includes a plurality of tag definitions indicative of a third party application used to generate purchase data files and the analyzing the processing to produce processing results determines a number of the plurality of tag definitions occurring in the intermediate data file and the process results include the number of the plurality of tag definitions occurring in the intermediate data file, and the selecting the best match configuration file of the multiplicity of configuration files selects the best match configuration file in response to the number of the plurality of tag definitions occurring in the intermediate data file.

18. The computer program according to claim 15 wherein the analyzing the processing to produce processing results determines a number of fields populated in the intermediate data file and the process results include the number of fields populated in the intermediate data file, and the selecting the best match configuration file of the multiplicity of configuration files selects the best match configuration file in response to the number of fields populated in the intermediate data file.

19. The computer program according to claim 15 wherein the processing of the at least the portion of the intermediate text file into the intermediate data file further includes validating the fields using the field definitions, the analyzing the processing to produce processing results determines a number of validated fields populated in the intermediate data file and the process results include the number of validated fields populated in the intermediate data file, and the selecting the best match configuration file of the multiplicity of configuration files selects the best match configuration file in response to the number of validated fields populated in the intermediate data file.

20. The computer program according to claim 15 wherein the analyzing the processing to produce processing results determines a number of lines of text in the intermediate text file utilized by the processing of the intermediate text file into the intermediate data file and the process results include the number of lines of text in the intermediate text file utilized by the processing of the intermediate text file into the intermediate data file, and the selecting the best match configuration file of the multiplicity of configuration files selects the best match configuration file in response to the number of lines of text in the intermediate text file utilized by the processing of the intermediate text file into the intermediate data file.

21. The computer program according to claim 15 wherein the analyzing the processing to produce processing results determines a number of lines of instructions in a configuration file utilized by the processing of the intermediate text file into the intermediate data file and the process results include the number of lines of instructions in the configuration file utilized by the processing of the intermediate text file into the intermediate data file, and the selecting the best match configuration file of the multiplicity of configuration files selects the best match configuration file in response to the number of lines of instructions in the configuration file utilized by the processing of the intermediate text file into the intermediate data file.

* * * * *